United States Patent
Yasuda

(10) Patent No.: US 10,670,809 B2
(45) Date of Patent: Jun. 2, 2020

(54) OPTICAL TRANSMISSION DEVICE AND CONTROL METHOD

(71) Applicant: Fujitsu Optical Components Limited, Kawasaki-shi, Kanagawa (JP)

(72) Inventor: Shuichi Yasuda, Sapporo (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 16/380,464

(22) Filed: Apr. 10, 2019

(65) Prior Publication Data

US 2019/0369334 A1 Dec. 5, 2019

(30) Foreign Application Priority Data

Jun. 1, 2018 (JP) .................. 2018-106441

(51) Int. Cl.
*G02B 6/26* (2006.01)
*G02B 6/35* (2006.01)
(Continued)

(52) U.S. Cl.
CPC ............. *G02B 6/266* (2013.01); *G02B 6/293* (2013.01); *G02B 6/3518* (2013.01); *G02B 6/3586* (2013.01); *G02B 6/3594* (2013.01); *H04B 10/506* (2013.01); *H04B 10/564* (2013.01); *G02B 6/4206* (2013.01); *H01S 2301/04* (2013.01)

(58) Field of Classification Search
CPC .......... G02B 6/266; G02B 6/28; G02B 6/293; G02B 6/2933; G02B 6/29389; G02B 6/29391; G02B 6/3586; G02B 6/4201; G02B 6/4206; G02B 6/4214; G02B 6/3594; G02B 6/3518; G02B 7/182; G02B 26/00; H01S 3/1301; H01S 3/0085; H04B 10/506; H04B 10/564; H04B 10/572
USPC .................. 385/1–3, 15–24, 31, 92, 140; 398/182–198; 359/333, 337, 337.1
See application file for complete search history.

(56) References Cited

U.S. PATENT DOCUMENTS

2003/0156779 A1* 8/2003 Wang ................. G02B 6/12021
385/15
2004/0141756 A1 7/2004 Nakamura et al.
(Continued)

FOREIGN PATENT DOCUMENTS

JP 2009-47917 3/2009
JP 2012-8562 1/2012

*Primary Examiner* — Michael P Mooney

(57) ABSTRACT

An optical transmission device controls driving of a mirror that adjusts an attenuation amount of a VOA and a transmission frequency of a TOF. The device acquires an adjustment amount of a reference voltage in which the intensity of output light becomes a target at detecting a change in the attenuation amount. The device calculates a deviation of an attenuation amount by using a difference between the reference frequency and the adjusted frequency specified from the characteristic of the mirror. The device calculates a deviation of an attenuation amount from a relationship at detecting a change in a new attenuation amount. The device calculates an adjustment amount by using a difference between the voltage of the reference frequency specified from the characteristic and the voltage of the frequency that is after deviation, adds the adjustment amount to the reference voltage, and sets the result.

7 Claims, 18 Drawing Sheets

(51) Int. Cl.
*H04B 10/50* (2013.01)
*G02B 6/293* (2006.01)
*H04B 10/564* (2013.01)
*G02B 6/42* (2006.01)

(56) References Cited

U.S. PATENT DOCUMENTS

2008/0085119 A1   4/2008   Ye et al.
2009/0052839 A1   2/2009   Shimizu et al.

* cited by examiner

OPTICAL TRANSMISSION DEVICE AND CONTROL METHOD

CROSS-REFERENCE TO RELATED APPLICATION

This application is based upon and claims the benefit of priority of the prior Japanese Patent Application No. 2018-106441, filed on Jun. 1, 2018, the entire contents of which are incorporated herein by reference.

FIELD

The embodiments discussed herein are related to an optical transmission device and a control method.

BACKGROUND

In an optical module that adds and drops wavelength division multiplexing (WDM) light, there is a part formed by integrating a variable optical amplifier (VOA) that adjusts the intensity of signal light with a tunable optical filter (TOF) that adjusts a transmission center frequency of the signal light. In an optical module, by adjusting an angle of a single unit of two dimensional micro electro mechanical systems (MEMS) mirror by using two axes and by adjusting a first axis, for example, a transmission center frequency of the TOF is adjusted, whereas, by adjusting a second axis, for example, an amount of attenuation of the VOA is adjusted. Consequently, it is possible to improve the optical signal noise ratio (OSNR) while adjusting the amount of attenuation of the signal light.

Patent Document 1: Japanese Laid-open Patent Publication No. 2012-8562
Patent Document 2: Japanese Laid-open Patent Publication No. 2009-47917
Patent Document 3: U.S. Patent Application Publication No. 2004/0141756
Patent Document 4: U.S. Patent Application Publication No. 2008/0085119

However, with the MEMS mirror functioning as an optical module, the sensitivity is high due to covering a wide range of frequency band and thus a setting error of an angle is present due to product variations or the like. In the optical module, when the amount of attenuation of the VOA is changed, the second axis of the MEMS mirror needs to be adjusted; however, if a setting error is present, a transmission center frequency of the TOF may possibly be deviated. This situation is remarkably exhibited in high rate signal light having a large spectral width.

Thus, if a transmission center frequency of the TOF is deviated in accordance with a change in the amount of attenuation, the optical module adjusts the first axis of the MEMS mirror so as to eliminate the deviation of the transmission center frequency by using feedback control. However, time is needed for the optical module to eliminate the deviation of the transmission center frequency caused by a change in the amount of attenuation and thus the quality of transmission is degraded during this period of time.

SUMMARY

According to an aspect of an embodiment, an optical transmission device includes a mirror and a processor. The mirror adjusts an amount of attenuation of an adjustment function for adjusting an intensity of output light and adjusts a transmission frequency of a transmission function for transmitting the output light. The processor is configured to drive and control the mirror in accordance with an applied voltage. The processor is configured to acquire, when a change in the amount of attenuation has been detected, an amount of adjustment of a reference amount of voltage in which the intensity of the output light becomes a target value. The processor is configured to perform a first calculation including referring to a part characteristic of the mirror indicating an association relationship between a transmission frequency and an amount of voltage when the amount of attenuation is zero, specifying a reference transmission frequency and an adjusted transmission frequency that has been adjusted by the amount of adjustment, and calculating an amount of deviation caused by the change in the amount of attenuation by using a difference between the specified reference transmission frequency and the adjusted transmission frequency. The processor is configured to generate a relationship based on coordinates that indicate an association relationship between the amount of attenuation and the amount of deviation obtained at the time of detecting the change and based on the origin coordinates. The processor is configured to perform a second calculation including calculating, from the relationship, when a change in a new amount of attenuation has been detected, an amount of deviation associated with the amount of attenuation at the time of detecting the change. The processor is configured to perform a third calculation including referring to the part characteristic, specifying an amount of voltage of the reference transmission frequency and an amount of voltage of the transmission frequency that is after deviation obtained by adding the amount of deviation to the reference transmission frequency, and calculating an amount of adjustment by using a difference between the amount of voltage of the reference transmission frequency and the amount of voltage of the transmission frequency that is after the deviation. The processor is configured to set, in the driving and controlling, the applied voltage obtained by adding the reference amount of voltage to the calculated amount of adjustment.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Furthermore, the present invention is not limited to the embodiments. Furthermore, the embodiments described below may also be appropriately used in combination as long as processes do not conflict with each other.

[a] First Embodiment

Figure 1:
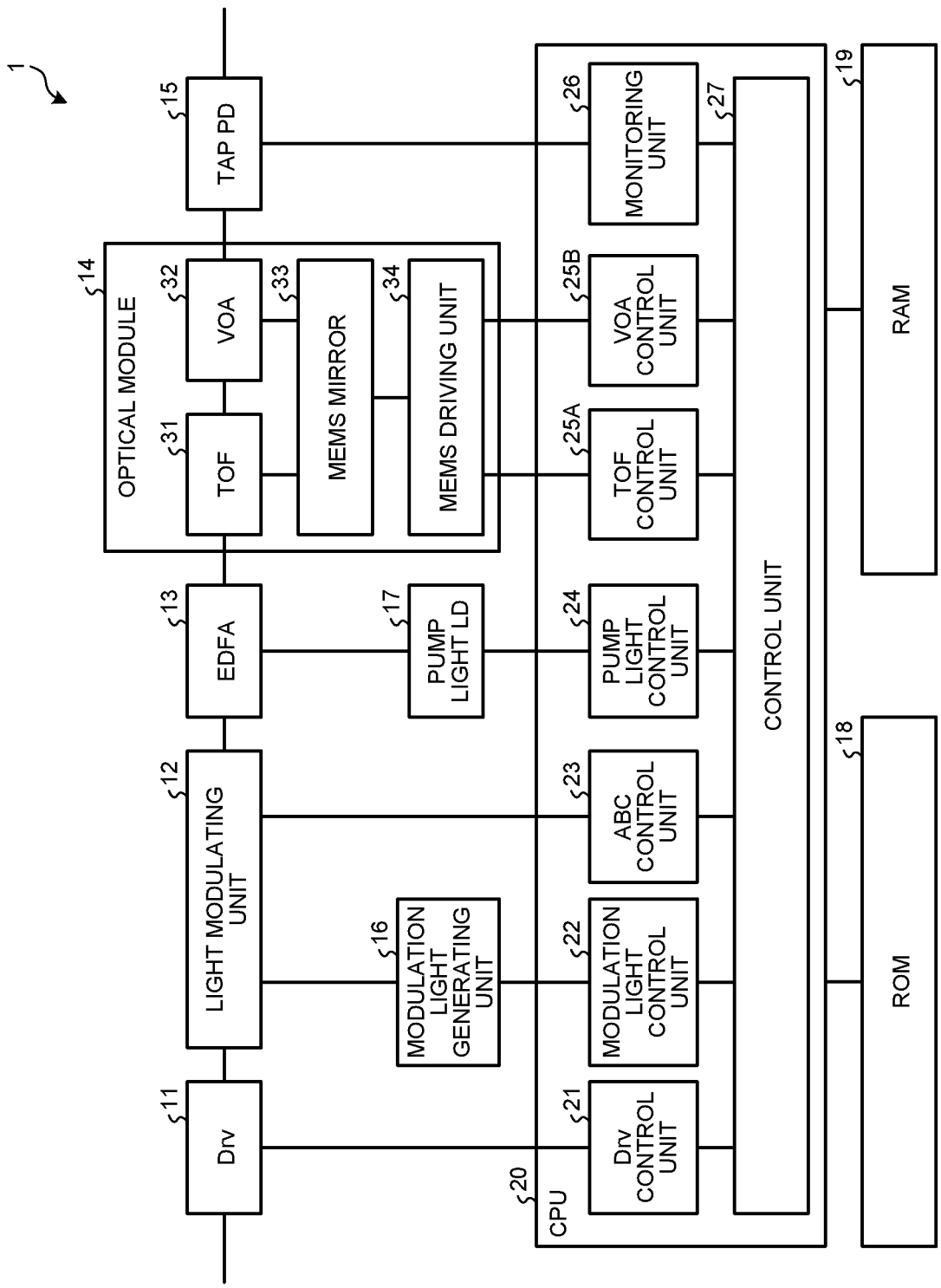
FIG. 1 is a block diagram illustrating an example of an optical transmission device according to a first embodiment.
Figure 2:
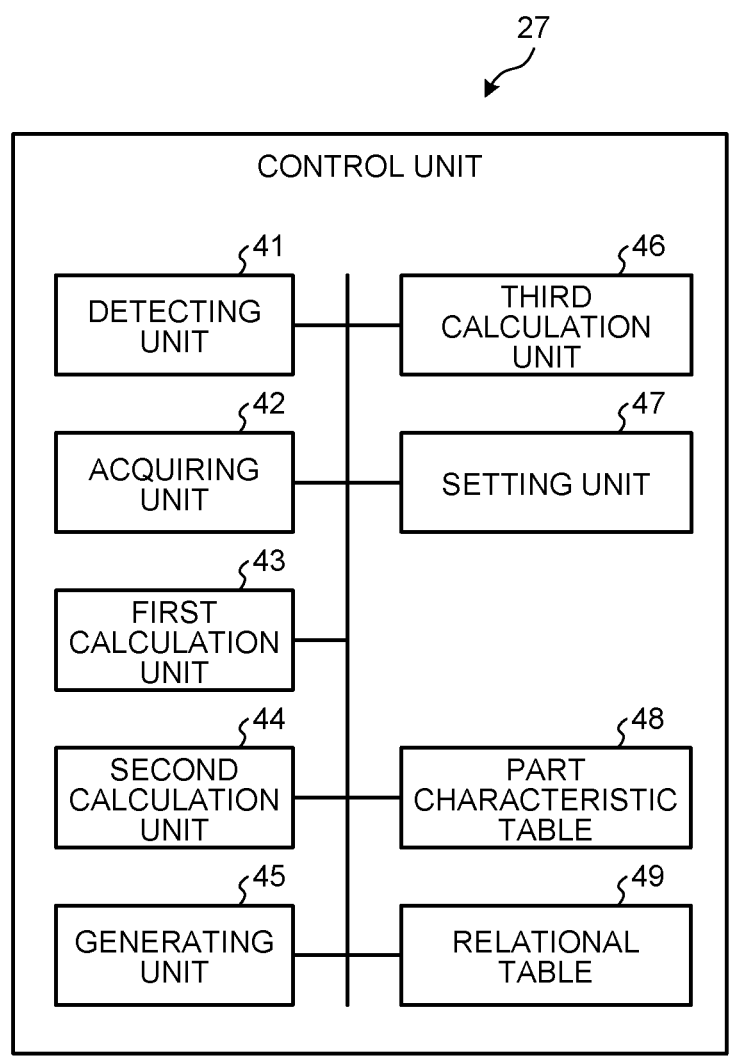
FIG. 2 is a diagram illustrating an example of a functional configuration of a control unit included in the optical transmission device.

FIG. 1 is a block diagram illustrating an example of an optical transmission device 1 according to a first embodiment. The optical transmission device 1 illustrated in FIG. 2 is, for example, a transmission device, such as an optical transmitter that transmits WDM signal light. The optical transmission device 1 includes a Dry unit 11, a light modulating unit 12, an erbium doped optical fiber amplifier (EDFA) 13, an optical module 14, and a tap photodiode (PD) 15. The optical transmission device 1 includes a modulation light generating unit 16, a pump light laser diode (LD) 17, a read only memory (ROM) 18, a random access memory (RAM) 19, and a central processing unit (CPU) 20. The Dry unit 11 amplifies data signals in electric power stages to a predetermined amplitude level. The light modulating unit 12 performs light modulation on the data signal output from the Dry unit 11 and then outputs signal light. The EDFA 13 performs light amplification on the signal light received from the light modulating unit 12. The optical module 14 has a VOA function for adjusting the level of the signal light subjected to the light amplification by the EDFA 13 and has a TOF function for removing noise of the signal light. The tap PD 15 is a PD that converts a part of the output light output from the optical module 14 into an electrical current. The modulation light generating unit 16 is an LD that generates modulation light used by the light modulating unit 12. The pump light LD 17 generates pump light emitted by being excited by the EDFA 13. The ROM 18 is an area for storing therein programs, such as various kinds of information. The RAM 19 is an area for storing therein various kinds of information. The CPU 20 performs overall control of the optical transmission device 1.

The optical module 14 includes a tunable optical filter (TOF) 31, a variable optical attenuator (VOA) 32, a micro electro mechanical systems (MEMS) mirror 33, and a MEMS driving unit 34. The optical module 14 adjusts the angle of the MEMS mirror 33 that is a single unit, thereby adjusting a transmission center frequency of the TOF 31 and an amount of attenuation of the VOA 32. The TOF 31 has a transmission function and is a filter or the like that adjusts the transmission center frequency of signal light. The VOA 32 has an adjustment function and is an amplifier or the like that adjusts the amount of attenuation of the signal light. The MEMS mirror 33 is a two-dimensional MEMS mirror that adjusts an angle by using two axes, i.e., that adjusts the transmission center frequency of the TOF 31 by performing angle adjustment by using a first axis and adjusts an amount of attenuation of the VOA 32 by performing angle adjustment by using a second axis. The MEMS driving unit 34 is a driver circuit that drives and controls the MEMS mirror 33 in accordance with an applied voltage. The MEMS driving unit 34 adjusts the transmission center frequency of the TOF 31 by driving the first axis of the MEMS mirror 33 in accordance with a first applied voltage. Furthermore, the transmission center frequency is the center frequency of the transmission frequency of the TOF 31 for transmitting output light having the currently used frequency. Furthermore, the MEMS driving unit 34 adjusts an amount of attenuation of the VOA 32 by adjusting the second axis of the MEMS mirror 33 in accordance with a second applied voltage.

The CPU 20 executes the programs stored in the ROM 18, thereby having the function of a Dry control unit 21, a modulation light control unit 22, an Auto Bias Control (ABC) control unit 23, a pump light control unit 24, a TOF control unit 25A, and a VOA control unit 25B. Furthermore, the CPU 20 has the function of a monitoring unit 26 and a control unit 27. The Dry control unit 21 controls the Dry unit 11. The modulation light control unit 22 controls the modulation light generating unit 16. The ABC control unit 23 controls the light modulating unit 12. The pump light control unit 24 controls the pump light LD 17. The TOF control unit 25A controls the first axis of the MEMS driving unit 34 in order to the transmission center frequency of the TOF 31 in accordance with the first applied voltage. The VOA control unit 25B controls the second axis of the MEMS driving unit 34 in order to adjust an amount of attenuation of the VOA 32 in accordance with the second applied voltage. The monitoring unit 26 detects an output light intensity by converting the signal light into an electrical current via the tap PD 15. The control unit 27 performs overall control of the CPU 20. The TOF control unit 25A adjusts the first applied voltage to be set in the MEMS driving unit 34 such that the output light intensity detected by the monitoring unit 26 becomes the target value. The VOA control unit 25B adjusts the second applied voltage to be set in the MEMS driving unit 34 such that the detected output light intensity becomes the target value.

FIG. 2 is a diagram illustrating an example of a functional configuration of the control unit 27 included in the optical transmission device 1. The control unit 27 illustrated in FIG. 2 includes a detecting unit 41, an acquiring unit 42, a first calculation unit 43, a second calculation unit 44, a generating unit 45, a third calculation unit 46, a setting unit 47, a part characteristic table 48, and a relational table 49. The detecting unit 41 detects a change in the amount of attenuation. The acquiring unit 42 acquires an amount of adjustment d1 with respect to a reference amount of applied voltage va in which the intensity of the output light becomes the target value in the MEMS driving unit 34. Furthermore, the reference amount of applied voltage va is the first applied voltage that is used to adjust a reference transmission center frequency fa of the TOF 31 and is, for example, 30 V. The reference transmission center frequency fa is a use frequency of signal light that is currently used for transmission.

Figure 3:
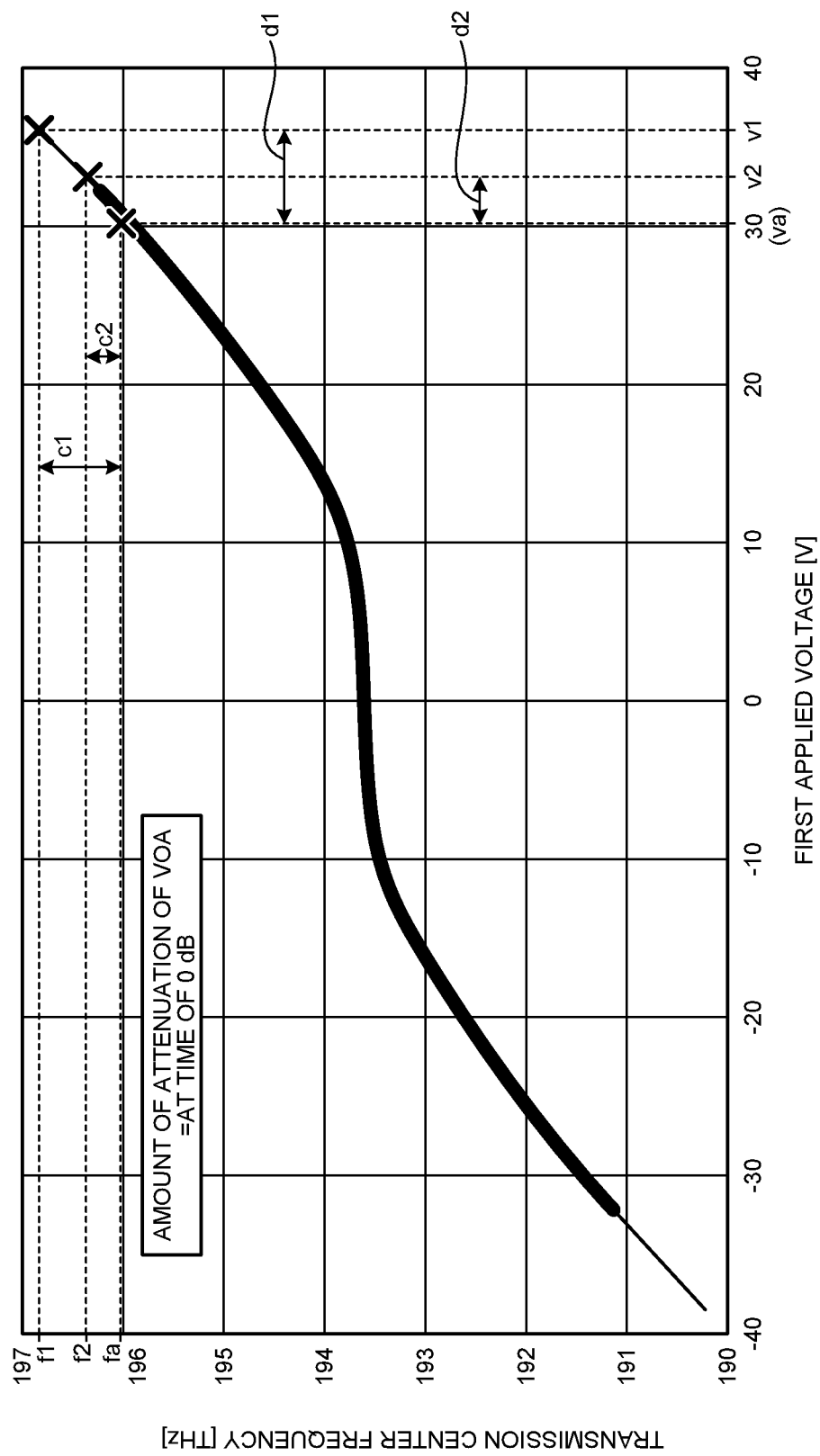
FIG. 3 is a diagram illustrating an example of product characteristics.

The first calculation unit 43 refers to a part characteristic that indicates an association relationship between the transmission center frequency and the amount of applied voltage obtained when the amount of attenuation of the MEMS mirror 33 is 0 dB and then specifies the reference transmission center frequency fa and the transmission center frequency f1 that has been adjusted by using the amount of adjustment d1. FIG. 3 is a diagram illustrating an example of product characteristics. The part characteristic illustrated in FIG. 3 is a part characteristic that indicates the association relationship between the transmission center frequency of the TOF 31 for the MEMS mirror 33 in the optical module 14 and an amount of applied voltage of the first applied voltage that is used to adjust the TOF 31 at the time when the amount of attenuation is 0 dB. Furthermore, for convenience of description, it is assumed that the reference transmission center frequency fa is 196 THz and the reference amount of applied voltage va is 30 V. It is assumed that the part characteristic is stored in the part characteristic table 48. The first calculation unit 43 uses a difference between the reference transmission center frequency fa and an adjusted transmission center frequency f1 and calculates an amount of deviation c1 caused by an amount of attenuation g1 at the time of detecting a change. Furthermore, the adjusted transmission center frequency f1 is obtained by adding the amount of adjustment d1 to the reference amount of applied voltage va and is transmission center frequency associated with the first amount of applied voltage in which the amount of adjustment d1 has been added.

Figure 4:
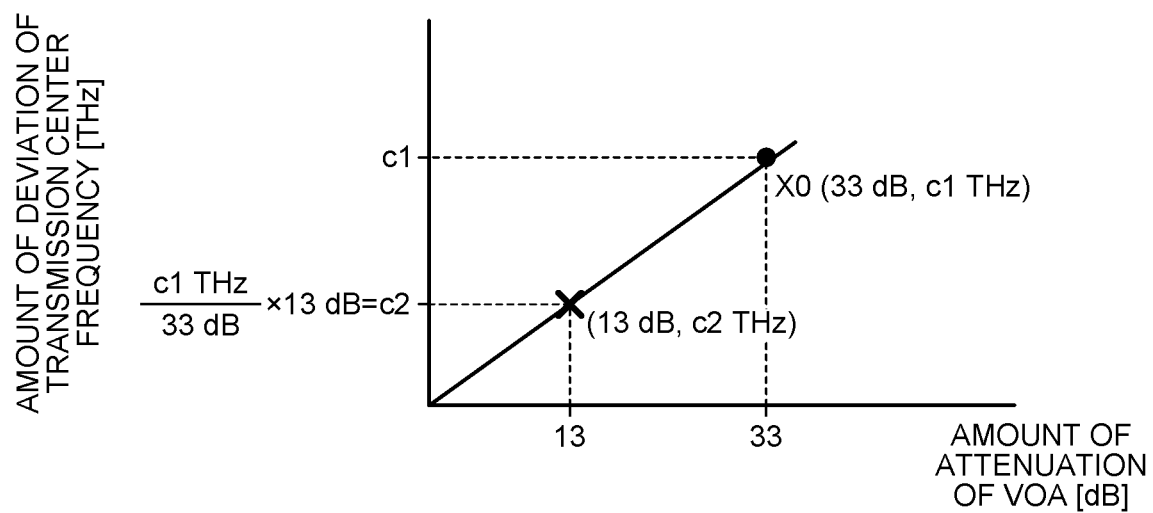
FIG. 4 is a diagram illustrating an example of a relationship according to the first embodiment.

FIG. 4 is a diagram illustrating an example of a relationship according to the first embodiment. The generating unit 45 generates a relationship by connecting the coordinates (33 dB, c1 THz) that associate the amount of attenuation g1 at the time of detecting a change with the amount of deviation c1 to the origin coordinates (0 dB, 0 THz). The generating unit 45 stores the generated relationship in the relational table 49.

When a change in an amount of attenuation is detected during the operation period, the second calculation unit 44 calculates an amount of deviation c2 that is associated with the amount of attenuation at the time of detecting the change based on the relationship stored in the relational table 49. When the second calculation unit 44 detects a change in the amount of attenuation of 13 dB during the operation period, the second calculation unit 44 calculates the amount of deviation c2 that is associated with the amount of attenuation of 13 dB based on the relationship illustrated in FIG. 4.

The third calculation unit 46 refers to the part characteristic that is currently stored in the part characteristic table 48 and specifies the amount of applied voltage va of the reference transmission center frequency fa and the amount of applied voltage v2 of the transmission center frequency f2 that is after deviation. Furthermore, the transmission center frequency f2 that is after deviation is the transmission center frequency that is obtained by adding the amount of deviation c2 to the reference transmission center frequency fa. The third calculation unit 46 calculates an amount of adjustment d2 by using a difference between the amount of applied voltage va of the reference transmission center frequency fa and the amount of applied voltage v2 of the transmission center frequency f2 that is after deviation. Furthermore, the amount of adjustment d2 is a voltage to be added to the first applied voltage that is the reference amount of applied voltage. The setting unit 47 adds the amount of adjustment d2 to the reference amount of applied voltage va and sets the first applied voltage in the MEMS driving unit 34. Consequently, the MEMS driving unit 34 adjusts the angle of the first axis of the MEMS mirror 33 such that the deviation of the transmission center frequency of the TOF 31 caused by a change in the amount of attenuation is eliminated by the first applied voltage, i.e., the calculation result of the amount of applied voltage va+the amount of adjustment d2.

Figure 5:
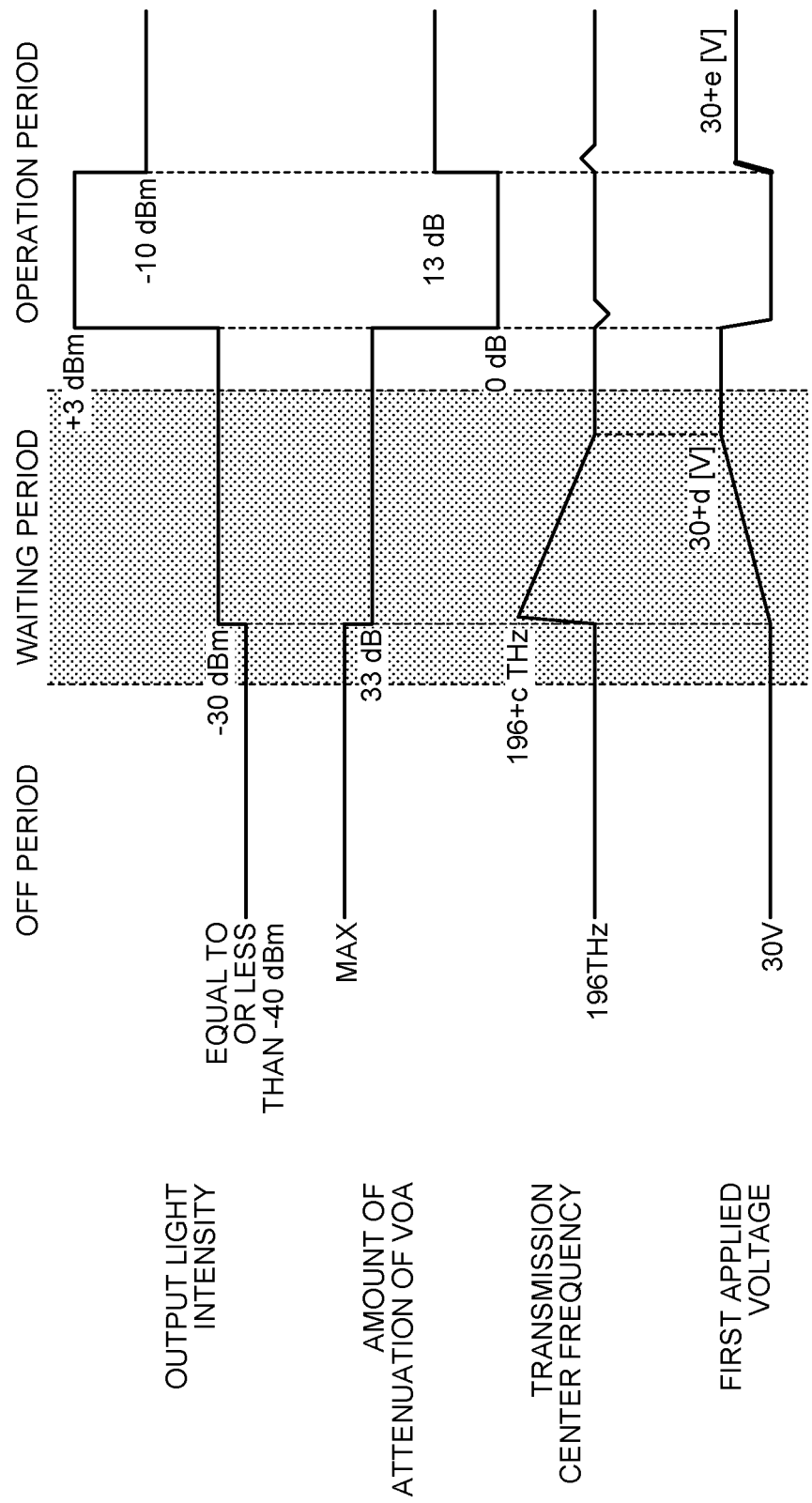
FIG. 5 is a diagram illustrating an example of a variation shift of a first applied voltage in accordance with a change in intensity of output light in an OFF period, a waiting period, and an operation period according to the first embodiment.

FIG. 5 is a diagram illustrating an example of a variation shift of the first applied voltage in accordance with a change in intensity of output light in the OFF period, the waiting period, and the operation period according to the first embodiment. The OFF period is a period in which the power supply of the optical transmission device 1 is in an OFF state. The waiting period is a period that is immediately before an ON state of the power supply of the optical transmission device 1. The operation period is a period for which communication of output light is available after the ON state of the power supply of the optical transmission device 1 via the start-up period. Furthermore, it is assumed that the transmission center frequency of the output light is 196 THz and the reference amount of applied voltage of the first applied voltage is +30 V.

In the OFF period, because the amount of attenuation of the VOA 32 is in a MAX state, the output light intensity detected by the monitoring unit 26 is equal to or less than −40 dBm. During the waiting period, the output light intensity needs to be maintained at −30 dBm. Thus, the VOA control unit 25B sets the first applied voltage in the MEMS driving unit 34 such that the output light intensity detected by the monitoring unit 26 is set to −30 dBm and the amount of attenuation of the VOA 32 is changed from the MAX to 33 dB. Consequently, if the amount of attenuation of the VOA 32 is changed, deviation is generated in the transmission center frequency of the TOF 31 in accordance with a change in the amount of attenuation due to a setting error of the angle.

When a change in the amount of attenuation of the VOA 32 is detected during the waiting period, in order to eliminate the amount of deviation of the transmission center frequency of the TOF 31, the setting unit 47 sets the first applied voltage obtained by adding the amount of adjustment d1 to the reference applied voltage (+30 V) in the MEMS driving unit 34. Consequently, it is possible to eliminate the amount of deviation c1 of the transmission center frequency while maintaining the output light intensity to −30 dBm. At this time, the generating unit 45 generates the relationship illustrated in FIG. 4 by connecting the origin coordinates to the coordinates of the amount of deviation c1 and the amount of attenuation 33 dB.

In the operation period, for example, when a change in the output light intensity from +3 dBm to −10 dBm is instructed, the VOA control unit 25B sets, in the MEMS driving unit 34, the second applied voltage that is used to change the amount of attenuation of the VOA 32 from 0 dB to 13 dB. When a change in the amount of attenuation of the VOA 32 from 0 dB to 13 dB is detected during the operation period, the second calculation unit 44 refers to the relationship illustrated in FIG. 4 and calculates the amount of deviation c2 associated with the amount of attenuation of 13 dB. The third calculation unit 46 refers to the part characteristic illustrated in FIG. 3 and calculates the amount of adjustment d2 associated with the amount of deviation c2. The setting unit 47 sets, in the MEMS driving unit 34, the first applied voltage obtained by adding the amount of adjustment d2 to the reference amount of applied voltage va. Consequently, even if a change in the amount of attenuation is detected during the operation period, by referring to the relationship while adjusting an amount of attenuation, it is possible to promptly eliminate the deviation of the transmission center frequency caused by a change in the amount of attenuation.

Figure 6:
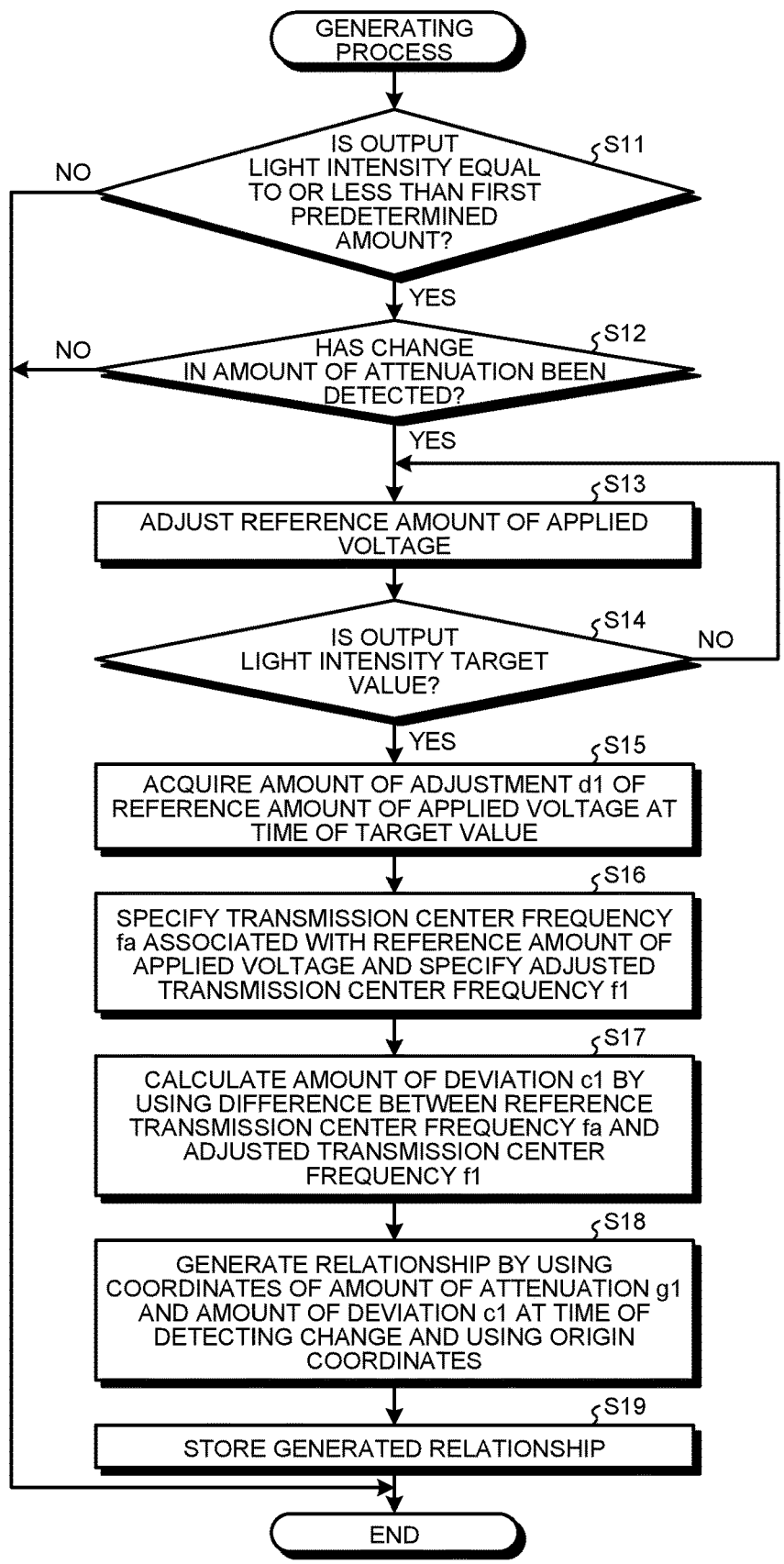
FIG. 6 is a flowchart illustrating an example of a processing operation of a CPU related to a generating process.

In the following, an operation of the optical transmission device 1 according to the first embodiment will be described. FIG. 6 is a flowchart illustrating an example of a processing operation of the CPU 20 related to a generating process. The generating process illustrated in FIG. 6 is a process for generating the relationship from an amount of deviation of the transmission center frequency caused by a change in the amount of attenuation of the VOA 32 during the waiting period that is immediately before the operation period.

In FIG. 6, the detecting unit 41 in the control unit 27 determines whether the output light intensity is equal to or less than the first predetermined amount (Step S11). Furthermore, the first predetermined amount mentioned here is a predetermined intensity of output light that is set during the waiting period. If the output light intensity is equal to or less than the first predetermined amount (Yes at Step S11), the detecting unit 41 determines whether a change in the amount of attenuation has been detected (Step S12).

If a change in the amount of attenuation has been detected (Yes at Step S12), the setting unit 47 in the control unit 27 adjusts the first amount of applied voltage and sets the first amount of applied voltage in the MEMS driving unit 34 (Step S13). The setting unit 47 determines whether the output light intensity detected by the monitoring unit 26 is the target value (Step S14). If the output light intensity is not the target value (No at Step S14), the setting unit 47 move to Step S13 in order to adjust the first applied voltage and sets the first applied voltage in the MEMS driving unit 34.

The acquiring unit 42 in the control unit 27 acquires the amount of adjustment d1 of the reference amount of applied voltage va that is the first applied voltage obtained at the time of the target value (Step S15). The first calculation unit 43 in the control unit 27 refers to the part characteristic illustrated in FIG. 3 and specifies the transmission center frequency fa associated with the reference amount of applied voltage va and transmission center frequency f1 associated with the amount of applied voltage v1 that has been adjusted by using the amount of adjustment d1 (Step S16). The first calculation unit 43 calculates the amount of deviation c1 by using a difference between the specified reference transmission center frequency fa and the adjusted transmission center frequency f1 (Step S17).

The generating unit 45 generates the coordinates X0 indicating an association relationship between the amount of attenuation g1 and the amount of deviation c1 at the time of detecting a change and then generates a relationship by connecting the coordinates X0 to the origin coordinates (Step S18). Furthermore, the generating unit 45 stores the generated relationship in the relational table 49 (Step S19) and ends the processing operation illustrated in FIG. 6. If the output light intensity is not equal to or less than the first predetermined amount (No at Step S11), the detecting unit 41 ends the processing operation illustrated in FIG. 6. If the detecting unit 41 does not detect a change in the amount of attenuation (No at Step S12), the detecting unit 41 ends the processing operation illustrated in FIG. 6.

Figure 7:
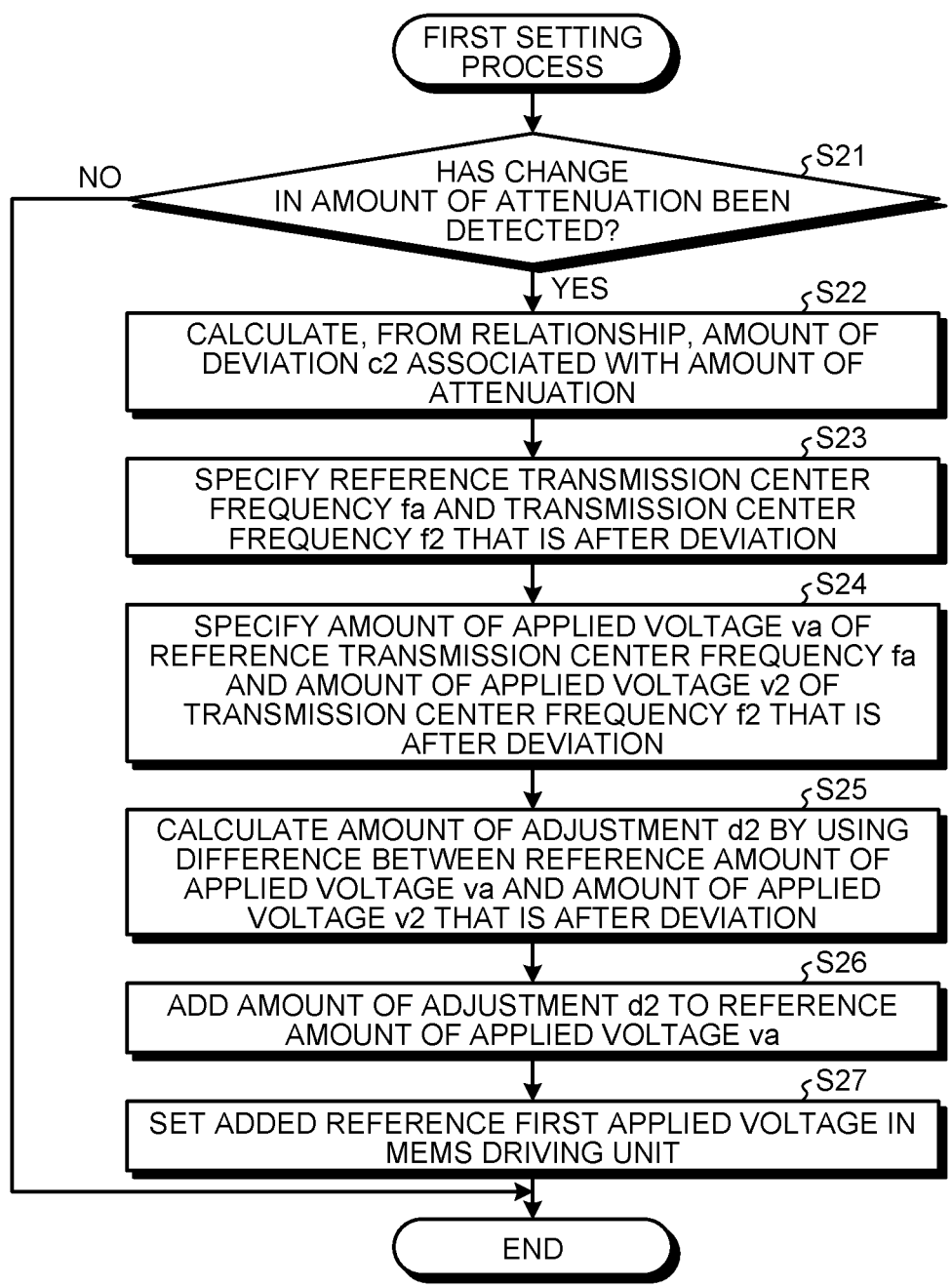
FIG. 7 is a flowchart illustrating an example of a processing operation of the CPU related to a first setting process.

FIG. 7 is a flowchart illustrating an example of a processing operation of the CPU 20 related to a first setting process. The first setting process illustrated in FIG. 7 is a process for setting, in the MEMS driving unit 34 when a change in the amount of attenuation is detected during the operation period, the amount of applied voltage that is used to suppress the deviation of the transmission center frequency caused by a change in the amount of attenuation by using the generated relationship.

In FIG. 7, the detecting unit 41 determines whether a change in the amount of attenuation has been detected (Step S21). If a change in the amount of attenuation has been detected (Yes at Step S21), the second calculation unit 44 refers to the relationship illustrated in FIG. 4 and calculates the amount of deviation c2 associated with the amount of attenuation (Step S22).

The third calculation unit 46 in the control unit 27 refers to the part characteristic illustrated in FIG. 3 and specifies the reference transmission center frequency fa and the transmission center frequency f2 that is after the deviation and that is obtained by adding the amount of deviation c2 to the transmission center frequency fa (Step S23). The third calculation unit 46 refers to the part characteristic and specifies the amount of applied voltage va of the reference transmission center frequency fa and the amount of applied voltage v2 of the transmission center frequency f2 that is after the deviation (Step S24).

The third calculation unit 46 calculates the amount of adjustment d2 by using a difference between the reference amount of applied voltage va and the amount of applied voltage v2 that is after the deviation (Step S25). By adding the amount of adjustment d2 to the reference amount of applied voltage va (Step S26), the third calculation unit 46 sets the added reference first applied voltage in the MEMS driving unit 34 (Step S27) and ends the processing operation illustrated in FIG. 7. If the detecting unit 41 does not detect a change in the amount of attenuation (No at Step S21), the detecting unit 41 ends the processing operation illustrated in FIG. 7.

The optical transmission device 1 according to the first embodiment acquires, if a change in the amount of attenuation is detected during the waiting period, an amount of adjustment of the reference amount of applied voltage in which the intensity of output light becomes the target value; refers to the part characteristic; and specifies the reference transmission center frequency and the adjusted transmission center frequency. Furthermore, the optical transmission device 1 calculates the amount of deviation caused by a change in the amount of attenuation by using a difference between the specified reference transmission center frequency and the adjusted transmission center frequency and then generates the relationship from the coordinates X0 and the origin coordinates indicating the association relationship between the amount of attenuation and the amount of deviation at the time of detecting the change. Consequently, because the optical transmission device 1 holds the relationship generated during the waiting period, the optical transmission device 1 can promptly eliminate the amount of deviation of the transmission center frequency caused by a change in the amount of attenuation during the operation period.

Furthermore, when detecting a change in a new amount of attenuation during the operation period, the optical transmission device 1 calculates an amount of deviation associated with the amount of attenuation at the time of detecting a change based on the relationship; refers the part characteristic; and specifies the amount of applied voltage of the reference transmission center frequency and the amount of applied voltage of the transmission center frequency that is after the deviation. Furthermore, the optical transmission device 1 calculates the amount of adjustment by using a difference between the amount of applied voltage of the reference transmission center frequency and the amount of applied voltage of the transmission center frequency that is after the deviation and then sets, in the MEMS driving unit 34, the first applied voltage obtained by adding the reference amount of applied voltage to the calculated amount of adjustment. Consequently, it is possible to decrease the time needed to eliminate the amount of deviation of the transmission center frequency caused by a changed in the amount of attenuation and improve the transmission quality.

Furthermore, in the optical transmission device 1 according to the first embodiment described above, the relationship is generated by using the single coordinates X0 that is generated during the waiting period; however, the relationship may also be generated by using a plurality of coordinates by acquiring a plurality of coordinates during the waiting period and, furthermore, modifications are possible as needed. Furthermore, it may also be possible to acquire a plurality of coordinates during, for example, the operation period instead of the waiting period and generate a relationship by using the acquired plurality of coordinates. The embodiment in this case will be described below as a second embodiment. Furthermore, by assigning the same reference numerals to components having the same configuration as those in the first embodiment, overlapped descriptions of the configuration and the operation thereof will be omitted.

[b] Second Embodiment

Figure 8:
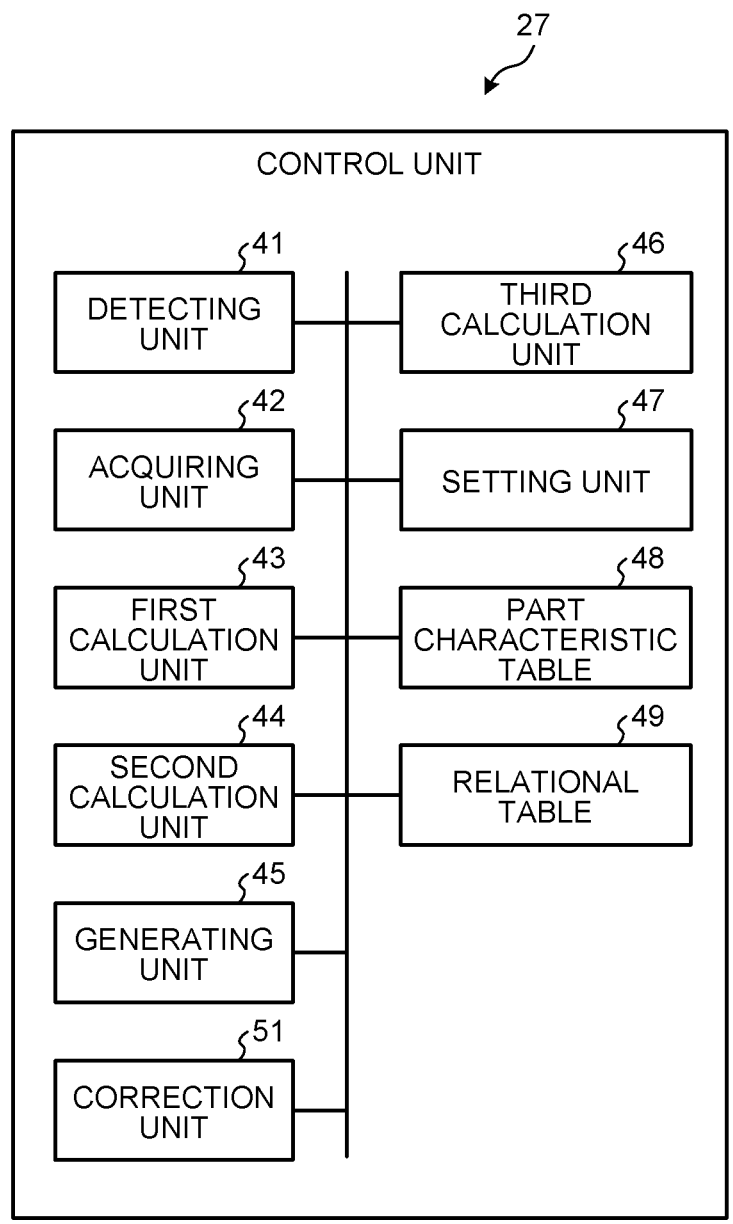
FIG. 8 is a diagram illustrating an example of a functional configuration of a control unit according to a second embodiment.

FIG. 8 is a diagram illustrating an example of a functional configuration of the control unit 27 according to a second embodiment. The control unit 27 illustrated in FIG. 8 includes a correction unit 51 in addition to the detecting unit 41, the acquiring unit 42, the first calculation unit 43, the second calculation unit 44, the generating unit 45, the third calculation unit 46, the setting unit 47, the part characteristic table 48, and the relational table 49. The correction unit 51 generates a plurality of coordinates used for the relationship even during the operation period and corrects the relationship by using the generated coordinates. The correction unit 51 updates the corrected relationship into the relational table 49.

Figure 9:
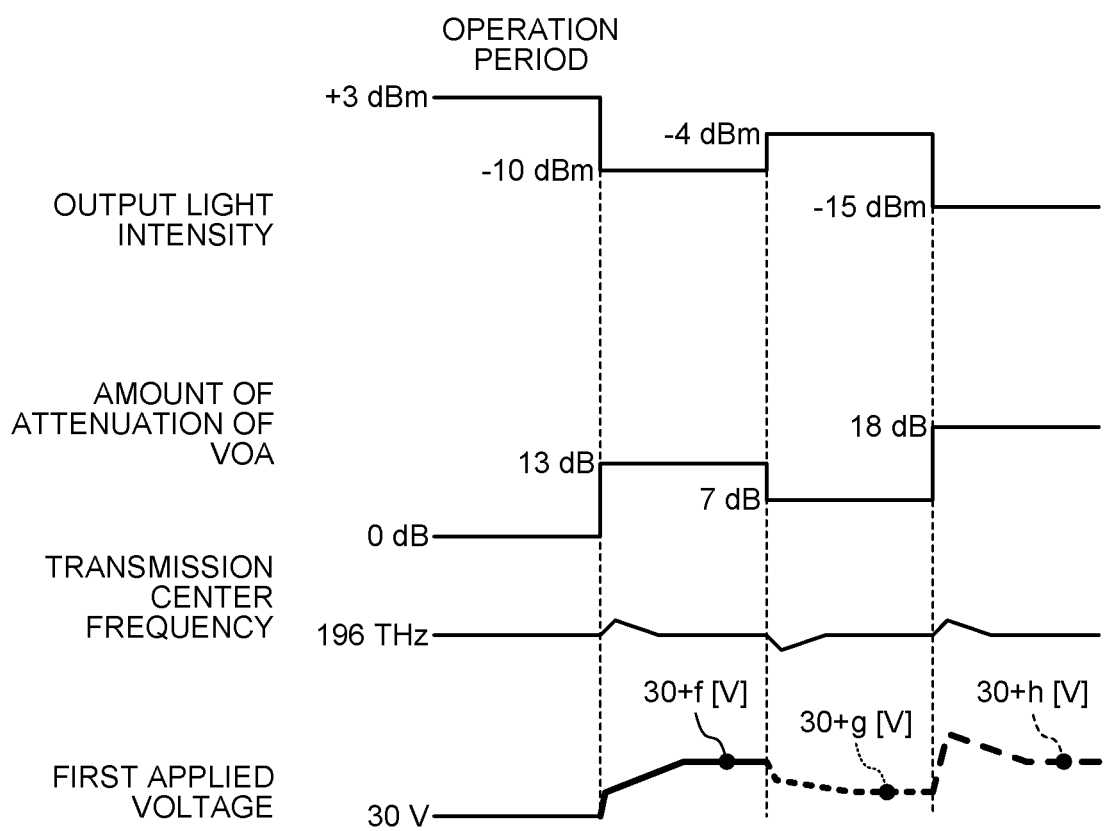
FIG. 9 is a diagram illustrating an example of a variation shift of a first applied voltage in accordance with a change in intensity of output light during an operation period according to a e second embodiment.
Figure 10:
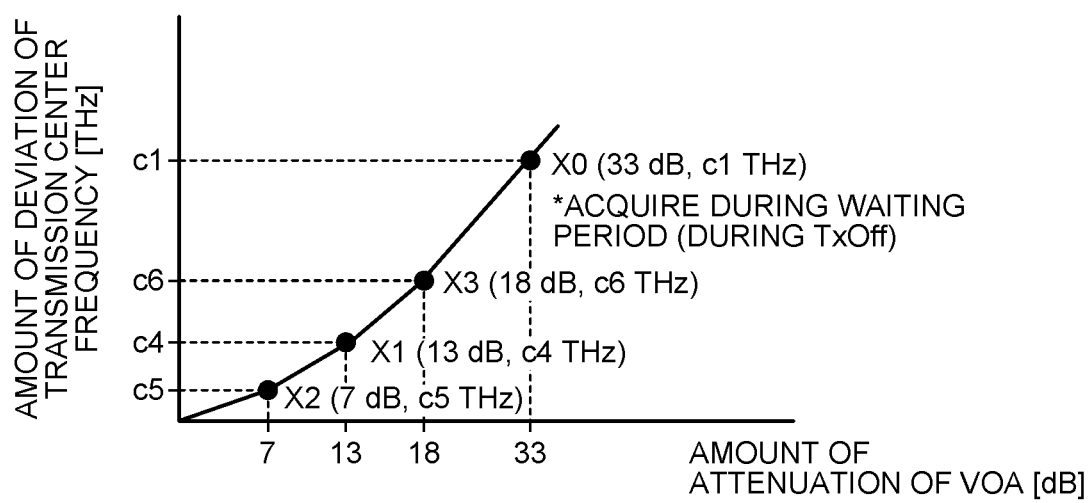
FIG. 10 is a diagram illustrating an example of a relationship according to the second embodiment.

FIG. 9 is a diagram illustrating an example of a variation shift of a first applied voltage in accordance with a change in intensity of output light during an operation period according to the second embodiment. FIG. 10 is a diagram illustrating an example of a relationship according to the second embodiment. When the control unit 27 detects a change in the amount of attenuation of the VOA 32 from 0 dB to 13 dB in order to change the output light intensity from +3 dBm to −10 dBm, the control unit 27 calculates an amount of deviation c4 in accordance with the amount of adjustment f of the first applied voltage by using the relationship illustrated in FIG. 4. The correction unit 51 generates first coordinates X1 (13 dB, c4 THz) indicating an association relationship between the amount of attenuation of 13 dB and the amount of deviation c4 at the time of detecting a change. The correction unit 51 generates a relationship by connecting the coordinates X0 (33 dB, c1 THz), the first coordinates X1 (13 dB, c4 THz), and the origin coordinates (0 dB, 0 THz) acquired during the waiting period and updates the relationship into the relational table 49.

Then, when the control unit 27 detects a change in the amount of attenuation of the VOA 32 from 13 dB to 7 dB in order to change the output light intensity from −10 dBm to −4 dBm, the control unit 27 uses the relationship and calculates an amount of deviation c5 in accordance with an amount of adjustment g of the first applied voltage. The correction unit 51 generates second coordinates X2 (7 dB, c5 THz) indicating the association relationship between the amount of attenuation of 7 dB and the amount of deviation c4 at the time of detecting the change. The correction unit 51 generates a relationship by connecting the coordinates X0 (33 dB, c1 THz), the first coordinates X1 (13 dB, c4 THz), the second coordinates X2 (7 dB, c5 THz), and the origin coordinates (0 dB, 0 THz) and updates the relationship into the relational table 49.

Then, when the control unit 27 detects a change in the amount of attenuation of the VOA 32 from 7 dB to 18 dB in order to change the output light intensity from −4 dBm to −15 dBm, the control unit 27 uses the relationship and calculates an amount of deviation c6 in accordance with an amount of adjustment h of the first applied voltage. The correction unit 51 generates third coordinates X3 (18 dB, c6 THz) indicating the association relationship between the amount of attenuation 18B and the amount of deviation c6 at the time of detecting the change. The correction unit 51 generates the relationship, as illustrated in FIG. 10, by connecting the coordinates X0 (33 dB, c1 THz), the first coordinates X1 (13 dB, c4 THz), the second coordinates X2 (7 dB, c5 THz), the third coordinates X3 (18 dB, c6 THz), and the origin coordinates. Then, the correction unit 51 updates the generated relationship into the relational table 49. Consequently, because the relationship is corrected by using the plurality of coordinates generated during the operation period, it is possible to acquire the relationship with high accuracy.

Figure 11:
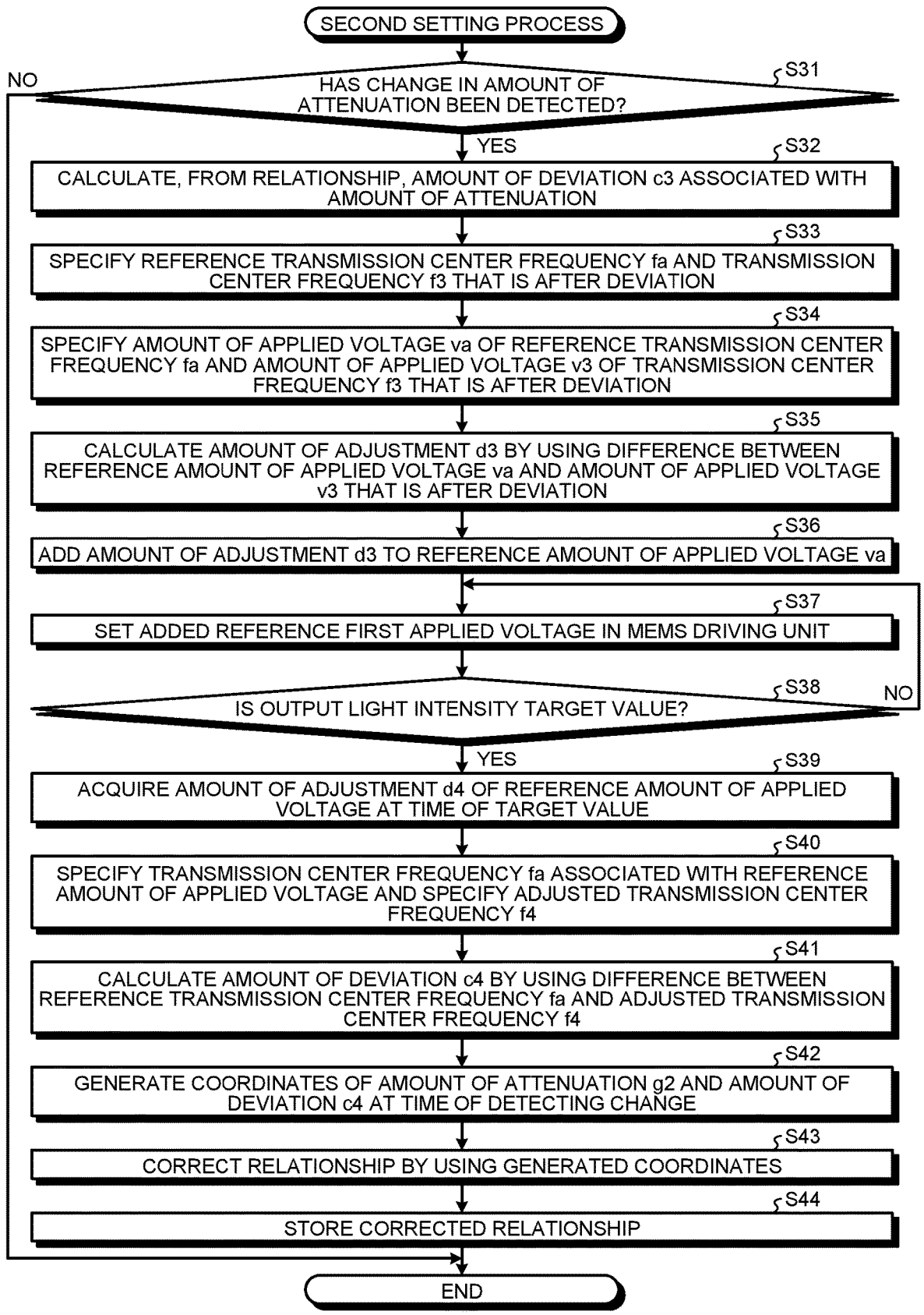
FIG. 11 is a flowchart illustrating an example of a processing operation of a CPU according to a second setting process.

In the following, the operation of the optical transmission device 1 according to the second embodiment will be described. FIG. 11 is a flowchart illustrating an example of the processing operation of the CPU 20 according to a second setting process. The second setting process illustrated in FIG. 11 is a process for correcting the relationship by using the plurality of coordinates sequentially generated during the operation period.

In FIG. 11, the detecting unit 41 determines whether a change in the amount of attenuation has been detected (Step S31). If a change in the amount of attenuation has been detected (Yes at Step S31), the third calculation unit 46 calculates the amount of deviation c3 associated with the amount of attenuation based on the relationship (Step S32). The third calculation unit 46 refers to the part characteristic illustrated in FIG. 3 and specifies the reference transmission center frequency fa and the transmission center frequency f3 that is after the deviation obtained by adding the amount of deviation c3 to the transmission center frequency fa (Step S33). The third calculation unit 46 specifies the amount of applied voltage va of the reference transmission center frequency fa and the amount of applied voltage v3 of the transmission center frequency f3 that is after the deviation (Step S34). The third calculation unit 46 calculates an amount of adjustment d3 by using the difference between the reference amount of applied voltage va and the amount of applied voltage v3 that is after the deviation (Step S35).

The setting unit 47 adds the amount of adjustment d3 to the reference amount of applied voltage va (Step S36) and sets the added first applied voltage in the MEMS driving unit 34 (Step S37). The setting unit 47 determines whether the output light intensity at the monitoring unit 26 is the target value (Step S38). If the output light intensity is not the target value (No at Step S38), the setting unit 47 moves to Step S37 in order to further adjust the first applied voltage and set the adjusted first applied voltage in the MEMS driving unit 34.

The acquiring unit 42 acquires an amount of adjustment d4 of the reference amount of applied voltage va that is the first applied voltage at the time of the target value (Step S39). The first calculation unit 43 refers to the part characteristic, specifies the transmission center frequency fa associated with the reference amount of applied voltage va, and specifies the transmission center frequency f4 associated with the amount of applied voltage v4 that has been adjusted by the amount of adjustment d4 (Step S40). The first calculation unit 43 calculates the amount of deviation c4 by using the difference between the specified reference transmission center frequency fa and the adjusted transmission center frequency f4 (Step S41).

The correction unit 51 in the control unit 27 generates the coordinates of the amount of attenuation g2 and the amount of deviation c4 at the time of detecting the change (Step S42) and corrects, by using the generated coordinates, the relationship that is being stored in the relational table 49 (Step S43). Furthermore, the correction unit 51 stores the corrected relationship in the relational table 49 (Step S44) and ends the processing operation illustrated in FIG. 11. If a change in the amount of attenuation has not been detected (No at Step S31), the detecting unit 41 ends the processing operation illustrated in FIG. 11.

Because the optical transmission device 1 according to the second embodiment generates the coordinates for each amount of deviation calculated during the operation period and corrects the relationship by using the generated coordinates, the optical transmission device 1 can acquire the relationship with high accuracy. Consequently, it is possible to decrease the time needed to eliminate the amount of deviation of the transmission center frequency caused by a changed in the amount of attenuation and improve the transmission quality.

With the optical transmission device 1 according to the second embodiment, a case in which the relationship is updated by using the coordinates generated during the operation period has been described; however, the relationship may also be corrected by using a plurality of coordinates generated during a start-up period that is before moving to the operation period after the waiting period. Thus, the embodiment in this case will be described below as a third embodiment. Furthermore, by assigning the same reference numerals to components having the same configuration as those in the second embodiment, overlapped descriptions of the configuration and the operation thereof will be omitted.

[c] Third Embodiment

Figure 12:
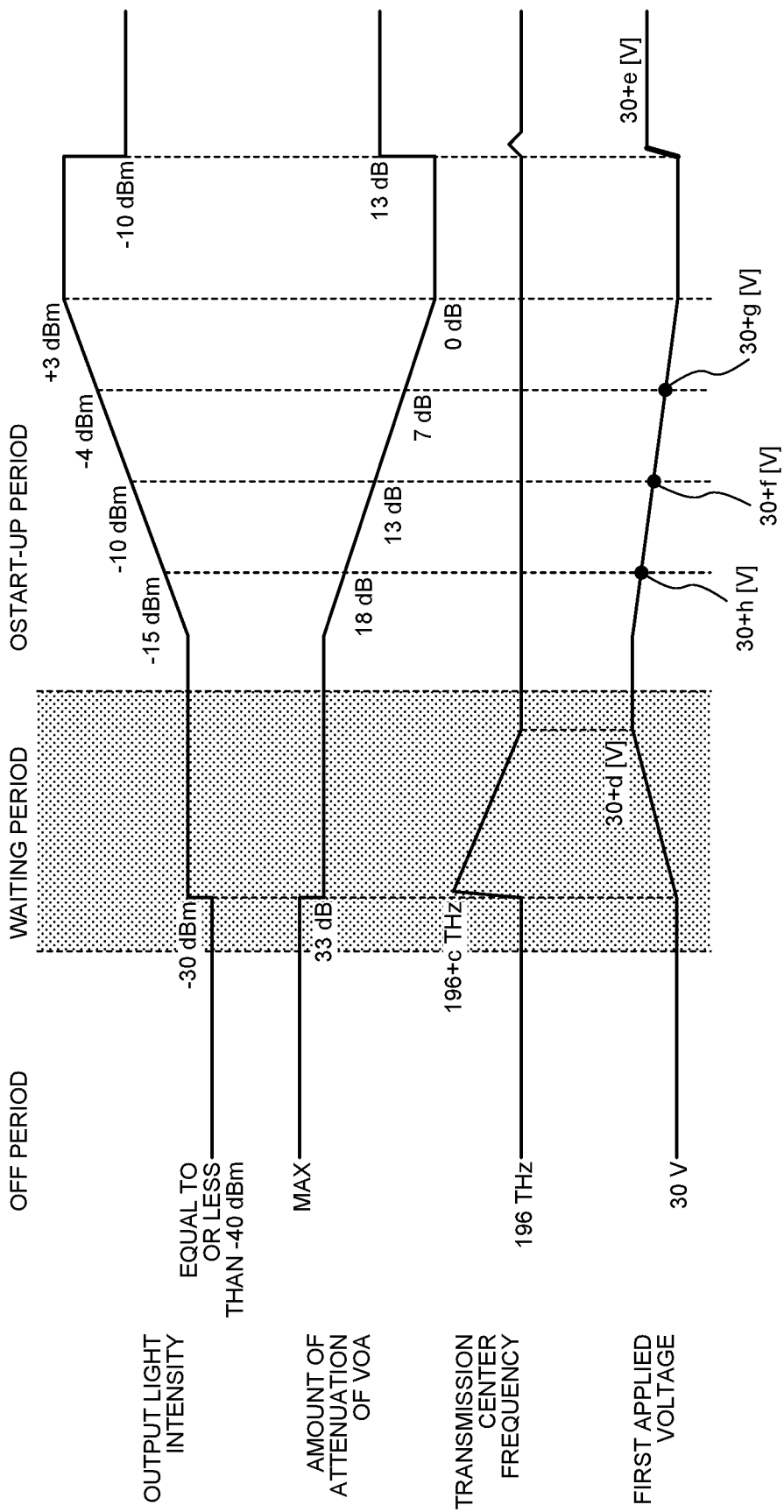
FIG. 12 is a diagram illustrating an example of a variation shift of a first applied voltage in accordance with a change in intensity of output light in an OFF period, a waiting period, and a start-up period according to a third embodiment.

FIG. 12 is a diagram illustrating an example of a variation shift of a first applied voltage in accordance with a change in intensity of output light in an OFF period, a waiting period, and a start-up period according to a third embodiment. The start-up period is a period that is before moving to the operation period after the waiting period. Furthermore, in the operation period illustrated in FIG. 5, the example in which the output light intensity during the waiting period is raised from −30 dBm to +3 dBm at once until the start-up time; however, in the start-up period illustrated in FIG. 12, the output light intensity is gradually raised.

When the control unit 27 detects a change in the amount of attenuation of the VOA 32 from 33 dB to 18 dB during the start-up period in order to change the output light intensity from −30 dBm to −15 dBm during the start-up period, the control unit 27 calculates an amount of deviation c7 that is in accordance with the amount of adjustment h of the first applied voltage by using the relationship. The correction unit 51 generates eleventh coordinates X11 (18 dB, c7 THz) indicating the association relationship between the amount of attenuation of 18 dB and the amount of deviation c7 at the time of detecting the change. The correction unit 51 generates the relationship by connecting the coordinates X0 (33 dB, c1 THz) acquired during the waiting period, the eleventh coordinates X11 (18 dB, c7 THz), and the origin coordinates (0 dB, 0 THz) and updates the relationship into the relational table 49.

Then, when the control unit 27 detects a change in the amount of attenuation of the VOA 32 from 18 dB to 13 dB in order to change the output light intensity from −15 dBm to −10 dBm, the control unit 27 calculates an amount of deviation c8 that is in accordance with an amount of adjustment f of the first applied voltage by using the relationship. The correction unit 51 generates twelfth coordinates X12 (13 dB, c8 THz) indicating the association relationship between the amount of attenuation 13 dB and the amount of deviation c8 at the time of detecting the change. The correction unit 51 generates the relationship by connecting the coordinates X0 (33 dB, c1 THz), the eleventh coordinates X11 (18 dB, c7 THz), the twelfth coordinates X12 (13 dB, c8 THz), and the origin coordinates (0 dB, 0 THz) and updates the relationship into the relational table 49.

Then, when the control unit 27 detects a change in the amount of attenuation of the VOA 32 from 13 dB to 7 dB in order to change the output light intensity from −10 dBm to −4 dBm, the control unit 27 calculates an amount of deviation c9 that is in accordance with an amount of adjustment g of the first applied voltage by using the relationship. The correction unit 51 generates thirteenth coordinates X13 (7 dB, c9 THz) indicating the association relationship between the amount of attenuation 7B and the amount of deviation c9 at the time of detecting the change. The correction unit 51 generates the relationship by connecting the coordinates X0 (33 dB, c1 THz), the eleventh coordinates X11 (18 dB, c7 THz), the twelfth coordinates X12 (13 dB, c8 THz), the thirteenth coordinates X13 (7 dB, c9 THz), and the origin coordinates. Then, the correction unit 51 updates the generated relationship into the relational table 49. Consequently, because the relationship is corrected by using the plurality of coordinates generated during the start-up period, it is possible to acquire the relationship with high accuracy.

Figure 13:
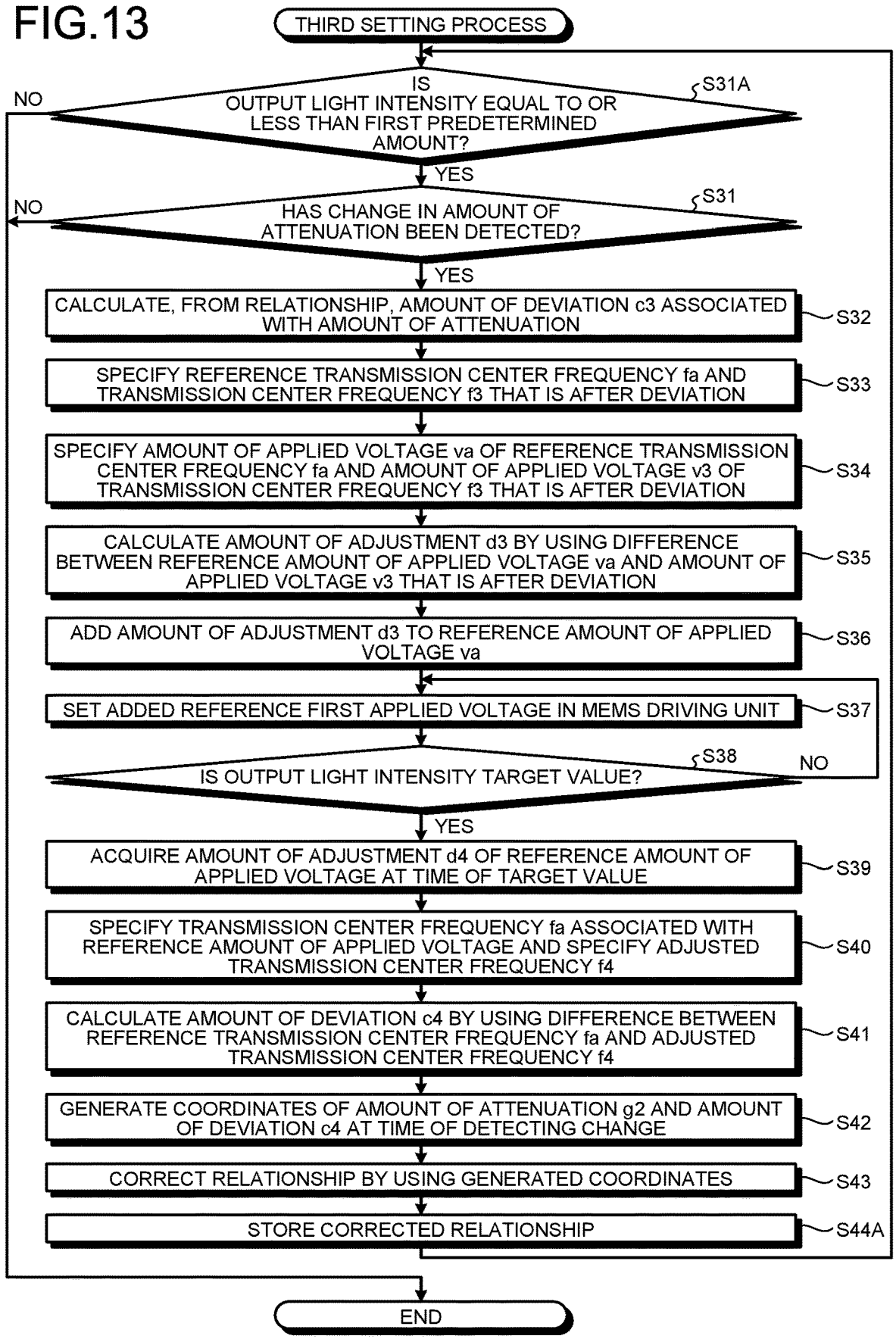
FIG. 13 is a flowchart illustrating an example of a processing operation of a CPU according to a third setting process.

In the following, an operation of the optical transmission device 1 according to the third embodiment will be described. FIG. 13 is a flowchart illustrating an example of a processing operation of the CPU 20 according to a third setting process. The third setting process illustrated in FIG. 13 is a process for correcting the relationship by using the plurality of coordinates generated during the start-up period that is the period of moving to the operation period from the waiting period.

In FIG. 13, the detecting unit 41 determines whether the output light intensity is equal to or less than the first predetermined amount (Step S31A). If the output light intensity is equal to or less than the first predetermined amount (Yes at Step S31A), the detecting unit 41 moves to Step S31 in order to determine whether a change in the amount of attenuation is detected. Furthermore, the correction unit 51 corrects the relationship by using the coordinates generated at Step S43, stores the corrected relationship in the relational table 49 (Step S44A), and moves to Step S31A in order to determine whether the output light intensity is equal to or less than the first predetermined amount.

The optical transmission device 1 according to the third embodiment generates the coordinates for each amount of deviation calculated during the start-up period and corrects the relationship by using the generated coordinates; therefore, the optical transmission device 1 can acquire the relationship with high accuracy. Consequently, it is possible to decrease the time needed to eliminate the amount of deviation of the transmission center frequency caused by a changed in the amount of attenuation and improve the transmission quality.

Furthermore, with the optical transmission device 1 according to the first embodiment described above, the relationship with respect to a single frequency from among a plurality of available frequencies; however, it may also be possible to store a relationship for each available frequency and the embodiment in this case will be described below as a fourth embodiment. Furthermore, by assigning the same reference numerals to components having the same configuration as those in the first embodiment, overlapped descriptions of the configuration and the operation thereof will be omitted.

[d] Fourth Embodiment

Figure 14:
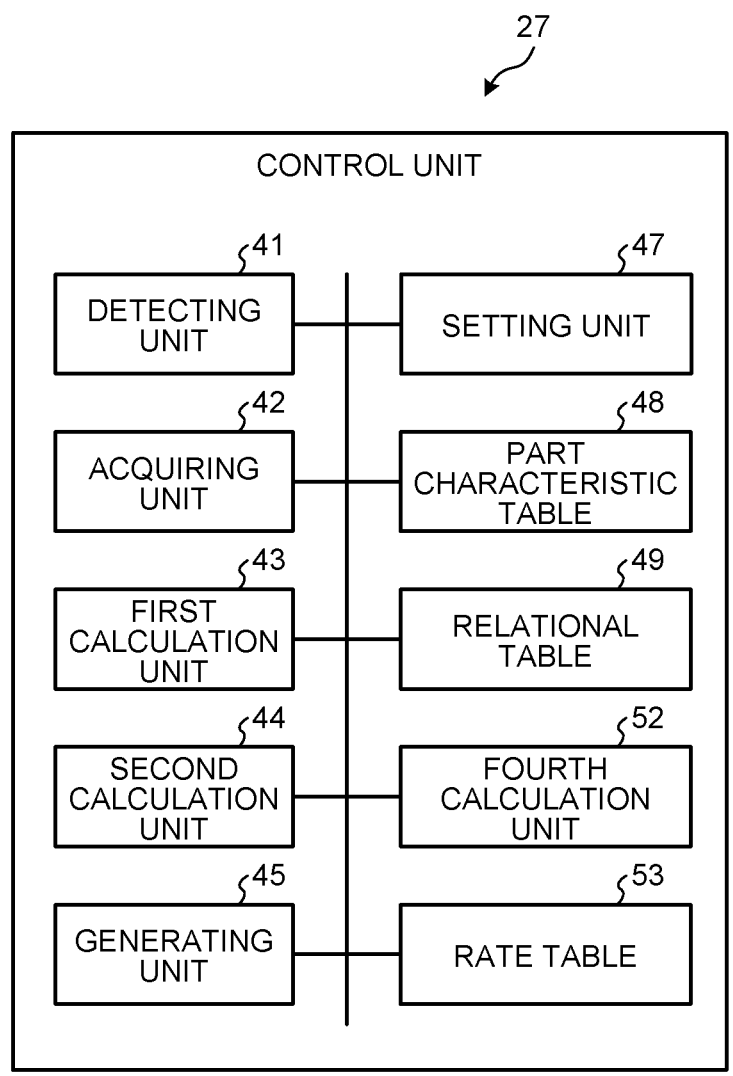
FIG. 14 is a diagram illustrating a functional configuration of a control unit according to a fourth embodiment.

FIG. 14 is a diagram illustrating a functional configuration of the control unit 27 according to the fourth embodiment. The control unit 27 illustrated in FIG. 14 includes a fourth calculation unit 52 and a rate table 53 in addition to the detecting unit 41, the acquiring unit 42, the first calculation unit 43, the second calculation unit 44, the generating unit 45, the setting unit 47, the part characteristic table 48, and the relational table 49.

Figure 15:
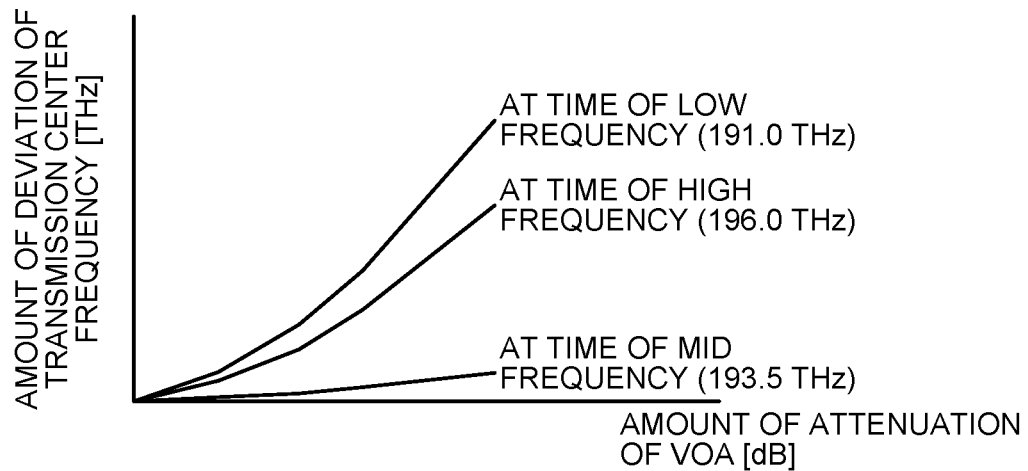
FIG. 15 is a diagram illustrating an example of a relationship according to the fourth embodiment.

FIG. 15 is a diagram illustrating an example of a relationship according to the fourth embodiment. The relationships illustrated in FIG. 15 includes the relationship associated with, for example, the frequency of 191.0 THz, the relationship associated with, for example, the frequency of 196.0 THz, and the relationship associated with, for example, the frequency of 193.5 THz.

Figure 16:
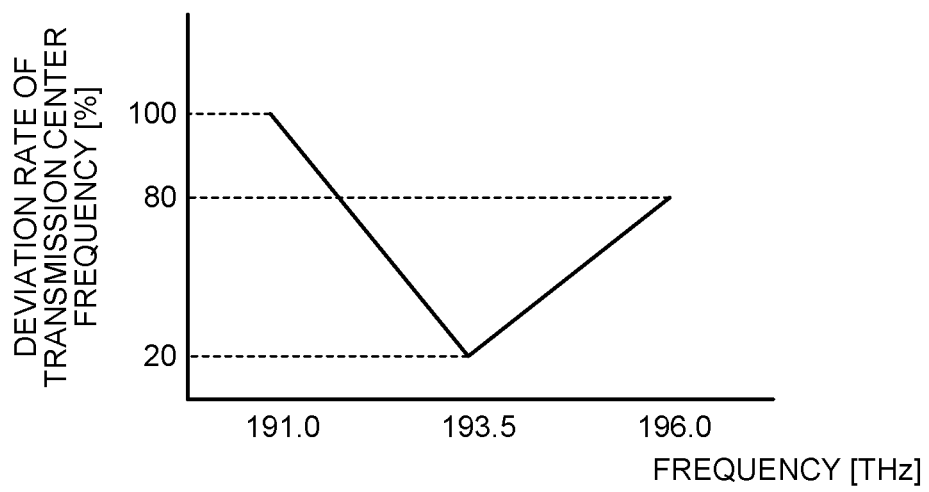
FIG. 16 is a diagram illustrating an example of a rate table.

FIG. 16 is a diagram illustrating an example of the rate table 53. The rate table 53 illustrated in FIG. 16 stores therein the rate of an amount of deviation for each use frequency. Furthermore, in a case where the amount of deviation of the use frequency 191.0 THz is set to 100%, it is assumed that the amount of deviation of the use frequency 193.5 THz is 20% of the amount of deviation of 191.0 THz and it is assumed that the amount of deviation of the use frequency 196.0 THz is 80% of the amount of deviation of 191.0 THz.

When the fourth calculation unit 52 has calculated an amount of deviation, the fourth calculation unit 52 calculates an amount of deviation that is in accordance with the current use frequency by acquiring the rate that is in accordance with the current use frequency from the rate table 53 and by multiplying the acquired rate by the amount of deviation.

Figure 17:
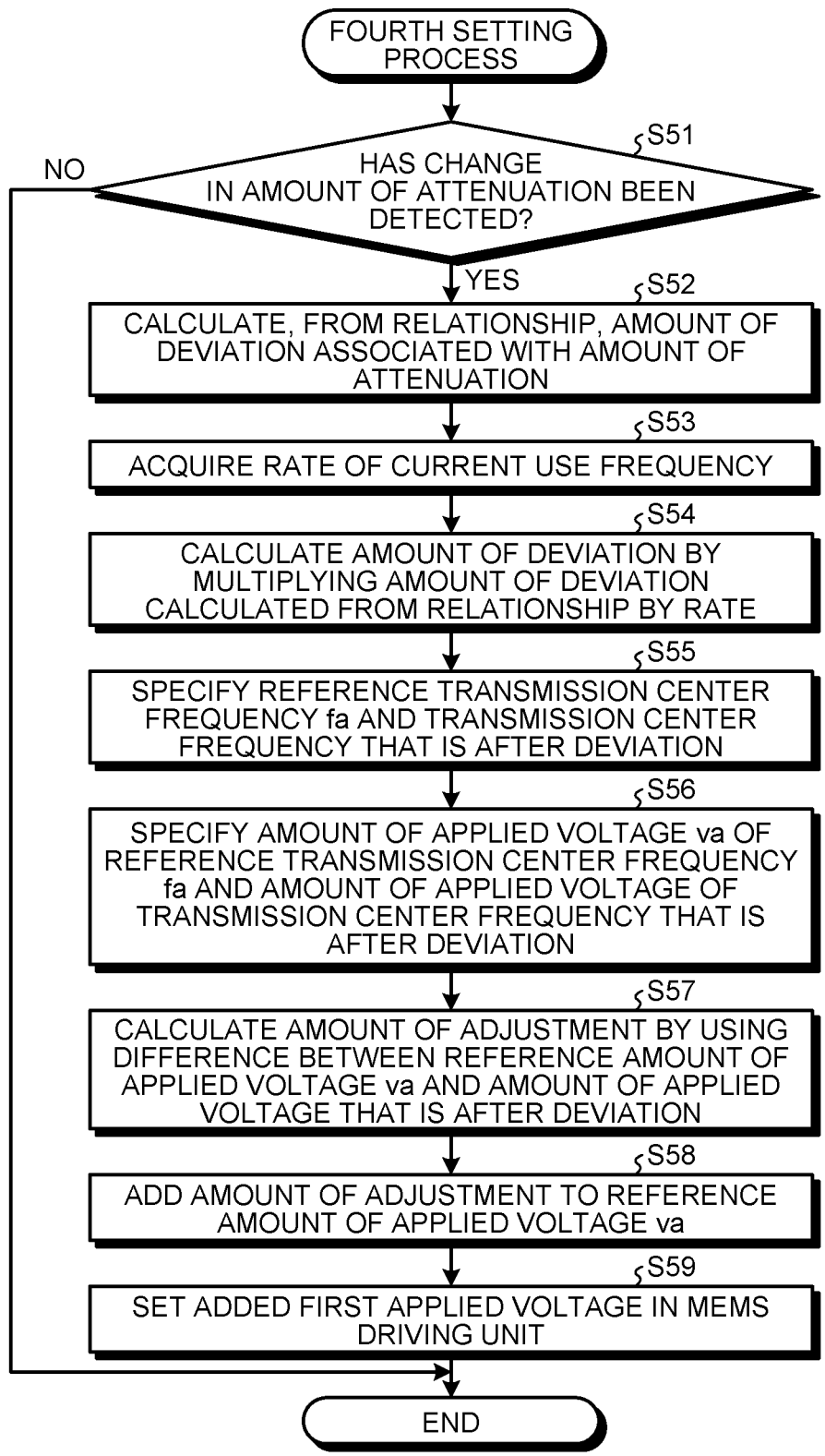
FIG. 17 is a flowchart illustrating an example of a processing operation of a CPU according to the fourth setting process.

In the following, an operation of the optical transmission device 1 according to the fourth embodiment will be described. FIG. 17 is a flowchart illustrating an example of a processing operation of the CPU 20 according to a fourth setting process. In FIG. 17, the detecting unit 41 included in the control unit 27 determines whether a change in the amount of attenuation has been detected (Step S51). If a change in the amount of attenuation has been detected (Yes at Step S51), the fourth calculation unit 52 calculates an amount of deviation associated with the amount of attenuation from the relationship (Step S52).

The fourth calculation unit 52 acquires the rate of the current use frequency from the rate table 53 (Step S53). The fourth calculation unit 52 calculates the amount of deviation by multiplying the amount of deviation calculated at Step S52 by the rate acquired at Step S53 (Step S54).

The third calculation unit 46 included in the control unit 27 refers to the part characteristic illustrated in FIG. 3, specifies the reference transmission center frequency fa, and specifies the transmission center frequency f2 that is after deviation obtained by adding the amount of deviation to the transmission center frequency fa (Step S55). The third calculation unit 46 refers to the part characteristic, specifies the amount of applied voltage va of the reference transmission center frequency fa, and specifies the amount of applied voltage of the transmission center frequency that is after the deviation (Step S56).

The third calculation unit 46 calculates an amount of adjustment by using a difference between the reference amount of applied voltage va and the amount of applied voltage that is after deviation (Step S57). By adding the amount of adjustment to the reference amount of applied voltage va (Step S58), the third calculation unit 46 sets the first applied voltage in the MEMS driving unit 34 (Step S59) and ends the processing operation illustrated in FIG. 17. If the detecting unit 41 does not detect a change in the amount of attenuation (No at Step S51), the detecting unit 41 ends the processing operation illustrated in FIG. 17.

With the optical transmission device 1 according to the fourth embodiment, if a change in new amount of attenuation is detected during the operation period, the optical transmission device 1 acquires the relationship associated with the current use frequency and calculates, from the acquired relationship, the amount of deviation that is associated with the amount of attenuation at the time of detecting the change. Consequently, by preparing a relationship for each use frequency, it is possible to smoothly eliminate, in accordance with the use frequency, an amount of deviation caused by a changed in the amount of attenuation.

For example, in a case where the intensity of output light and the use frequency is changed from the state of "+3 dBm, 196 THz" to the state of "−10 dBm, 191 THz", the amount of deviation of the transmission center frequency of the TOF 31 becomes (c1 THz/33 dm×13 dB)×(100%/80%) [THz].

Furthermore, the relationships for each of the use frequencies illustrated in FIG. 15 may also be previously stored in the relational table 49 or may also be generated every time the frequency of the output light is used and then the generated relationships may also be stored in the relational table 49.

The optical transmission device 1 according to the first embodiment described above calculates an amount of deviation at the time of detecting a change of the amount of attenuation during the operation period and performs the control operation of the TOF 31 based on the calculated amount of deviation every time an amount of deviation is calculated. However, it may also be possible to perform the control operation of the TOF 31 only when an amount of deviation is greater than the second predetermined amount and it may also be possible to skip the control operation of the TOF 31 when an amount of deviation is not greater than the second predetermined amount. The embodiment in this case will be described below as a fifth embodiment.

[e] Fifth Embodiment

Figure 18:
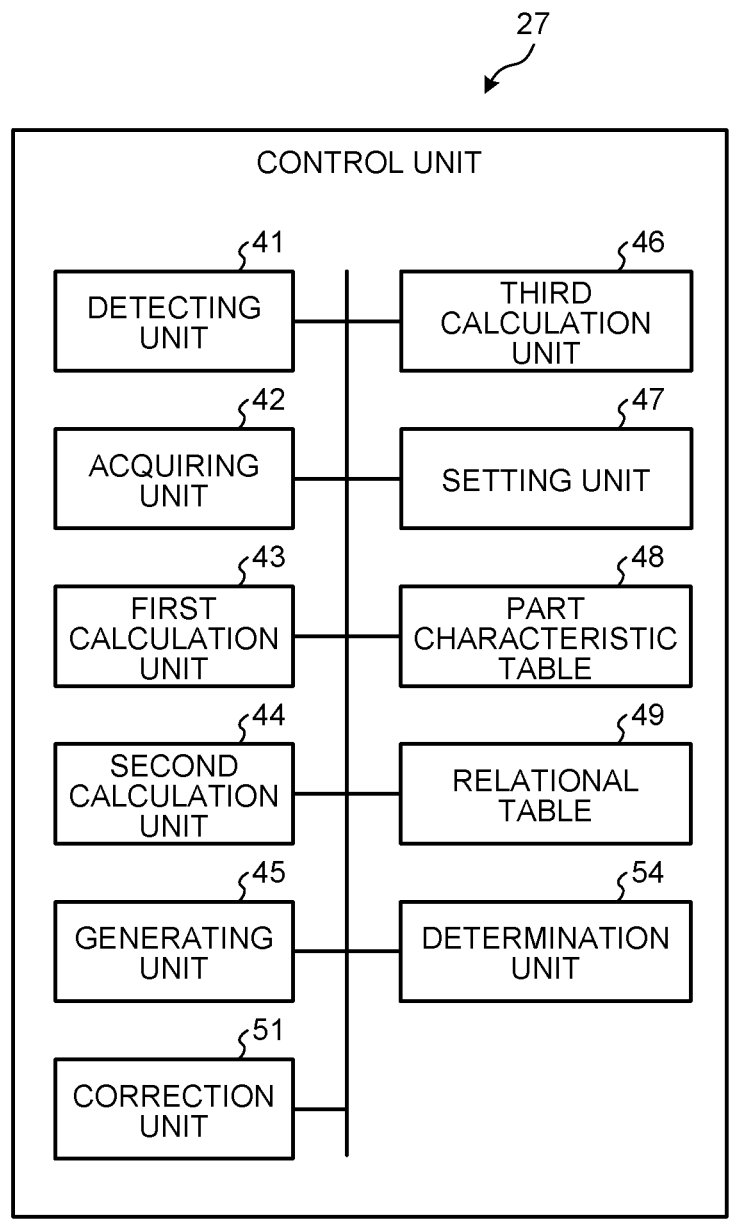
FIG. 18 is a diagram illustrating a functional configuration of a control unit according to a fifth embodiment.

FIG. 18 is a diagram illustrating a functional configuration of the control unit 27 according to a fifth embodiment. The control unit 27 illustrated in FIG. 18 includes a determination unit 54 in addition to the detecting unit 41, the acquiring unit 42, the first calculation unit 43, the second calculation unit 44, the generating unit 45, the third calculation unit 46, the setting unit 47, the part characteristic table 48, the relational table 49, and the correction unit 51. The determination unit 54 determines whether the amount of deviation calculated from the relationship is greater than the second predetermined amount. If the amount of deviation calculated from the relationship is greater than the second predetermined amount, the third calculation unit 46 performs the control operation of the TOF 31 for calculating an amount of adjustment. In contrast, if the amount of deviation calculated from the relationship is not greater than the second predetermined amount, the third calculation unit 46 skips the control operation of the TOF 31.

Figure 19:
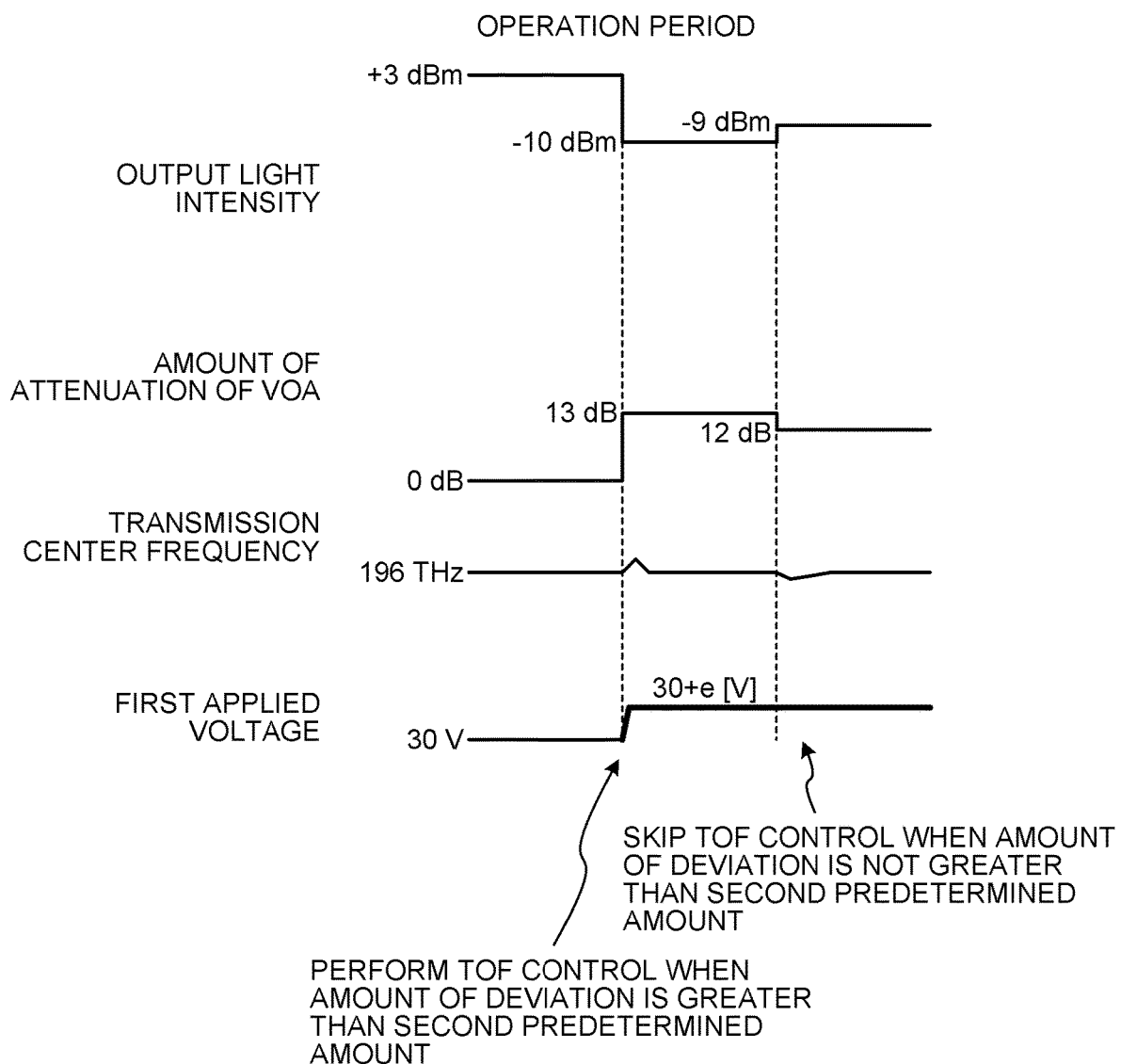
FIG. 19 is a diagram illustrating an example of a variation shift of a first applied voltage in accordance with a change in intensity of output light during an operation period according to the fifth embodiment.

FIG. 19 is a diagram illustrating an example of a variation shift of a first applied voltage in accordance with a change in intensity of output light during an operation period according to the fifth embodiment. When the control unit 27 detects a change in the amount of attenuation of the VOA 32 from 0 dB to 13 dB in order to change the output light intensity from +3 dBm to −10 dBm during the operation period, the control unit 27 calculates an amount of deviation according to the amount of attenuation 13 dB by using the relationship. The determination unit 54 determines whether the amount of deviation is greater than the second predetermined amount. If the amount of deviation is greater than the second predetermined amount, the third calculation unit 46 refers to the part characteristic illustrated in FIG. 3 and calculates the amount of adjustment associated with the amount of deviation. The setting unit 47 sets, in the MEMS driving unit 34, the first applied voltage obtained by adding the amount of adjustment to the reference amount of applied voltage va.

When the control unit 27 detects a change in the amount of attenuation of the VOA 32 from 13 dB to 12 dB in order to change the output light intensity from −10 dBm to −9 dBm during the operation period, the control unit 27 calculates the amount of deviation according to the amount of attenuation 12 dB by using the relationship. The determination unit 54 determines whether the amount of deviation is greater than the second predetermined amount. If the amount of deviation is not greater than the second predetermined amount, the third calculation unit 46 skips the calculation operation of the amount of adjustment. Consequently, because the amount of deviation is the minimum, it is thus possible to reduce the processing load applied to the control unit 27.

Figure 20:
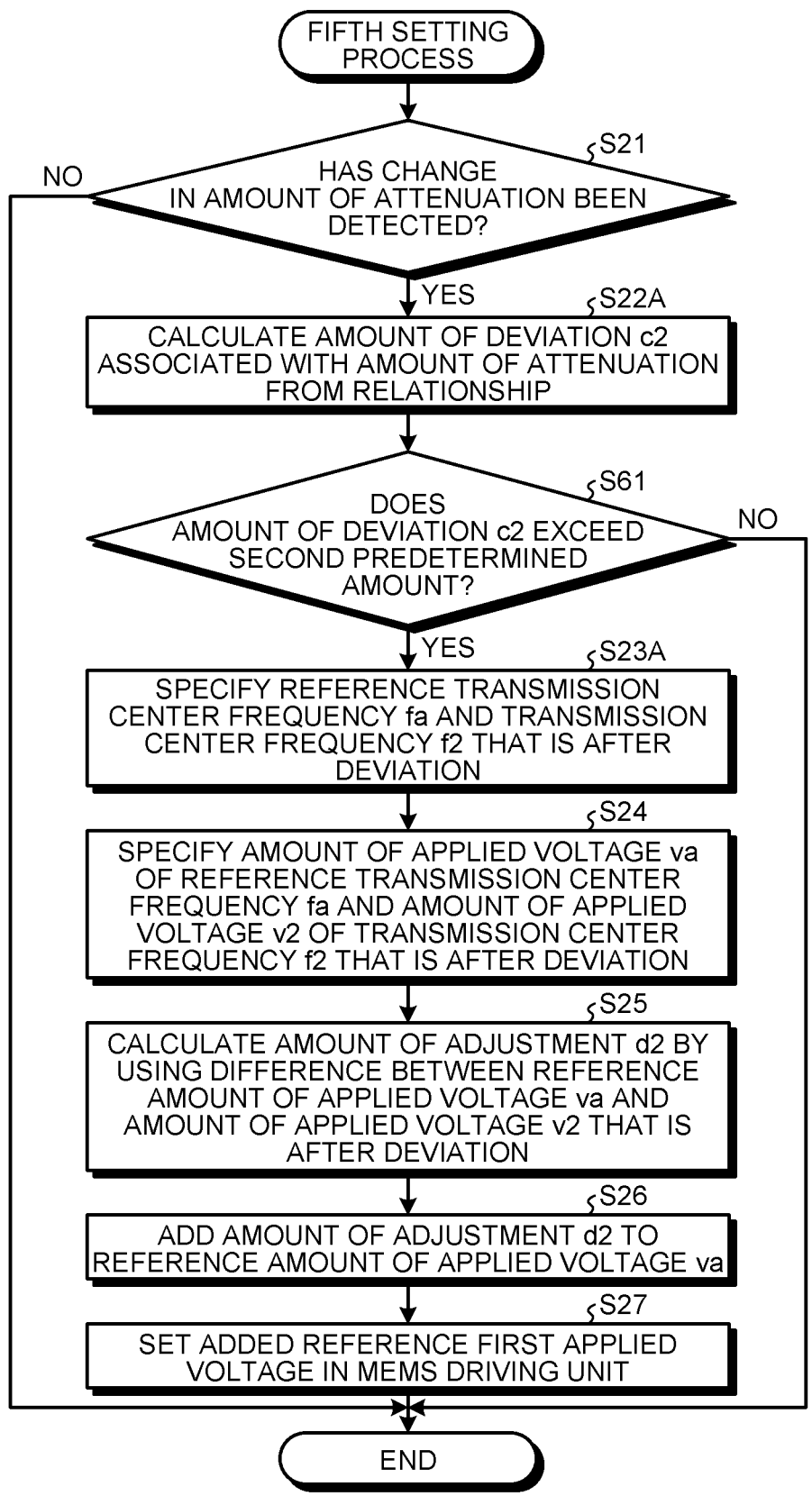
FIG. 20 is a flowchart illustrating an example of a processing operation of a CPU according to the fifth setting process.

In the following, an operation of the optical transmission device 1 according to the fifth embodiment will be described. FIG. 20 is a flowchart illustrating an example of a processing operation of the CPU 20 according to the fifth setting process. In FIG. 20, the second calculation unit 44 in the control unit 27 calculates the amount of deviation c2 associated with the amount of attenuation from the relationship (Step S22A). The determination unit 54 in the control unit 27 determines whether the amount of deviation c2 associated with the amount of attenuation calculated from the relationship exceeds the predetermined amount (Step S61). If the amount of deviation c2 exceeds the predetermined amount (Yes at Step S61), the third calculation unit 46 specifies, from the part characteristic, the reference transmission center frequency and the transmission center frequency that is associated with the amount of deviation (Step S23A) and moves to Step S24 in order to specify the amount of applied voltage from the part characteristic. If the amount of deviation c2 does not exceed the predetermined amount (No at Step S61), the third calculation unit 46 skips the calculation operation of the amount of adjustment and ends the processing operation illustrated in FIG. 20.

The optical transmission device 1 according to the fifth embodiment detects a change in the amount of attenuation; calculates the amount of deviation associated with the amount of attenuation from the relationship; and performs the control operation of the TOF 31 if the amount of deviation exceeds the second predetermined amount. Furthermore, if the amount of deviation does not exceed the second predetermined amount, the optical transmission device 1 skips the control operation of the TOF 31. Consequently, it is possible to reduce the processing load applied to the control unit 27 needed to perform the control operation of the TOF 31.

Furthermore, with the optical transmission device 1 according to the fifth embodiment, a case of determining whether the amount of deviation exceeds the second predetermined amount has been described as an example. However, the optical transmission device 1 may also determine whether an amount of change of an amount of attenuation exceeds a threshold; perform the control operation of the TOF 31 in a case where the amount of change exceeds the threshold; skip the control operation of the TOF 31 in a case where the amount of change does not exceed the threshold; and modifications are possible as needed.

Furthermore, the optical amplifier, such as the EDFA 13, has been used; however, the optical amplifier is not limited to the EDFA 13. For example, a semiconductor optical amplifier or a Raman amplifier, such as a thulium doped fiber amplifier, a praseodymium doped fiber amplifier, and modifications are possible as needed.

Each of the components in the units illustrated in the drawings is not always physically configured as illustrated in the drawings. In other words, the specific shape of a separate or integrated unit is not limited to the drawings; however, all or part of the unit can be configured by functionally or physically separating or integrating any of the units depending on various kinds of loads or use conditions.

According to an aspect of an embodiment, it is possible to reduce the time needed to eliminate deviation of a transmission frequency caused by a change in an amount of attenuation.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission device comprising:
   a mirror that adjusts an amount of attenuation of an adjustment function for adjusting an intensity of output light and that adjusts a transmission frequency of a transmission function for transmitting the output light; and a processor configured to:
   drive and control the mirror in accordance with an applied voltage;
   acquire, when a change in the amount of attenuation has been detected, an amount of adjustment of a reference amount of voltage in which the intensity of the output light becomes a target value;
   perform a first calculation including referring to a part characteristic of the mirror indicating an association relationship between a transmission frequency and an amount of voltage when the amount of attenuation is zero, specifying a reference transmission frequency and an adjusted transmission frequency that has been adjusted by the amount of adjustment, and calculating an amount of deviation caused by the change in the amount of attenuation by using a difference between the specified reference transmission frequency and the adjusted transmission frequency;
   generate a relationship based on coordinates that indicate an association relationship between the amount of attenuation and the amount of deviation obtained at the time of detecting the change and based on the origin coordinates;
   perform a second calculation including calculating, from the relationship, when a change in a new amount of attenuation has been detected, an amount of deviation associated with the amount of attenuation at the time of detecting the change;
   perform a third calculation including referring to the part characteristic, specifying an amount of voltage of the reference transmission frequency and an amount of voltage of the transmission frequency that is after deviation obtained by adding the amount of deviation to the reference transmission frequency, and calculating an amount of adjustment by using a difference between the amount of voltage of the reference transmission frequency and the amount of voltage of the transmission frequency that is after the deviation; and
   set, in the driving and controlling, the applied voltage obtained by adding the reference amount of voltage to the calculated amount of adjustment.

2. The optical transmission device according to claim 1, wherein, when a change in the amount of attenuation has been detected during a waiting period that is immediately before activation of the optical transmission device, the acquiring including acquiring the amount of adjustment of the reference amount of voltage in which the intensity of the output light becomes the target value.

3. The optical transmission device according to claim 1, wherein the acquiring including acquiring, when a change in the amount of attenuation has been detected during an operation period that is after activation of the optical transmission device, the amount of adjustment of the reference amount of voltage in which the intensity of the output light becomes the target value;
   the first calculation including referring to the part characteristic, specifying the reference transmission frequency and the adjusted transmission frequency, and calculating the amount of deviation by using the difference between the specified reference transmission frequency and the adjusted transmission frequency; and
   wherein the processor is further configured to correct the relationship based on the coordinates indicating the association relationship between the amount of attenuation and the amount of deviation at the time of detecting the change.

4. The optical transmission device according to claim 1, wherein the acquiring including acquiring, when a change in the amount of attenuation has been detected during a start-up period that is between activation of the optical transmission device and an operation period, the amount of adjustment of the reference amount of voltage in which the intensity of the output light becomes the target value;
   the first calculation including referring to the part characteristic, specifying the reference transmission frequency and the adjusted transmission frequency, and calculating the amount of deviation by using the difference between the specified reference transmission frequency and the adjusted transmission frequency; and
   wherein the processor is further configured to correct the relationship based on the coordinates indicating the association relationship between the amount of attenuation and the amount of deviation at the time of detecting the change.

5. The optical transmission device according to claim 1, wherein the processor is further configured to:
   store therein the relationship for each use frequency, and
   perform a fourth calculation including acquiring, when the change in the new amount of attenuation has been detected, the relationship associated with a current use frequency from the storing and calculating, from the acquired relationship, an amount of deviation associated with the amount of attenuation at the time of detecting the change.

6. The optical transmission device according to claim 1, wherein the processor is further configured to:
   determine whether the amount of deviation calculated from the relationship by the calculating exceeds a predetermined amount, and
   perform, when the amount of deviation exceeds the predetermined amount, a calculation operation of the third calculation and skip, when the amount of deviation does not exceed the predetermined amount, the calculation operation of the third calculation.

7. A control method performed by an optical transmission device comprising:
   a mirror that adjusts an amount of attenuation of an adjustment function for adjusting an intensity of output light and that adjusts a transmission frequency of a transmission function for transmitting the output light; and
   the control method comprising:
   driving and controlling the mirror in accordance with an applied voltage;
   acquiring, when detecting a change in the amount of attenuation, an amount of adjustment of a reference amount of voltage in which the intensity of the output light becomes a target value;
   referring to a part characteristic of the mirror indicating an association relationship between a transmission frequency and an amount of voltage when the amount of attenuation is zero, specifying a reference transmission frequency and an adjusted transmission frequency that has been adjusted by the amount of adjustment, and calculating an amount of deviation caused by the change in the amount of attenuation by using a difference between the specified reference transmission frequency and the adjusted transmission frequency;

generating a relationship based on coordinates that indicate an association relationship between the amount of attenuation and the amount of deviation obtained at the time of detecting the change and based on the origin coordinates;

calculating, from the relationship, when detecting a change in a new amount of attenuation, an amount of deviation associated with the amount of attenuation at the time of detecting the change;

referring to the part characteristic, specifying an amount of voltage of the reference transmission frequency and an amount of voltage of the transmission frequency that is after deviation obtained by adding the amount of deviation to the reference transmission frequency, and calculating an amount of adjustment by using a difference between the amount of voltage of the reference transmission frequency and the amount of voltage of the transmission frequency that is after the deviation; and setting, in the drive control unit, the applied voltage obtained by adding the reference amount of voltage to the calculated amount of adjustment.

* * * * *